US012659951B2

(12) United States Patent
Fu et al.

(10) Patent No.: US 12,659,951 B2
(45) Date of Patent: Jun. 16, 2026

(54) BLIND DETECTION METHOD AND APPARATUS FOR PDCCH CANDIDATE, USER EQUIPMENT, ELECTRONIC DEVICE AND STORAGE MEDIUM

(71) Applicant: SAMSUNG ELECTRONICS CO., LTD., Suwon-si (KR)

(72) Inventors: Jingxing Fu, Beijing (CN); Yi Wang, Beijing (CN); Feifei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 17/905,154

(22) PCT Filed: Feb. 24, 2021

(86) PCT No.: PCT/KR2021/002273
§ 371 (c)(1),
(2) Date: Aug. 26, 2022

(87) PCT Pub. No.: WO2021/172851
PCT Pub. Date: Sep. 2, 2021

(65) Prior Publication Data
US 2023/0096674 A1     Mar. 30, 2023

(30) Foreign Application Priority Data

Feb. 26, 2020     (CN) .......................... 202010120917.0
Jul. 1, 2020     (CN) .......................... 202010628867.7

(51) Int. Cl.
*H04W 4/00*         (2018.01)
*H04L 1/00*         (2006.01)
(Continued)

(52) U.S. Cl.
CPC ....... *H04W 72/1273* (2013.01); *H04L 1/0038* (2013.01); *H04W 72/1268* (2013.01); *H04W 72/23* (2023.01)

(58) Field of Classification Search
CPC ......... H04W 72/1273; H04W 72/1268; H04W 72/23; H04W 48/12; H04W 24/02;
(Continued)

(56) References Cited

U.S. PATENT DOCUMENTS 9,807,737 B2     10/2017 Yang et al.
10,694,392 B2     6/2020 Ouchi et al.
(Continued)

FOREIGN PATENT DOCUMENTS

CN        107148789 A        9/2017
CN        110138500 A        8/2019
(Continued)

OTHER PUBLICATIONS

International Search Report and Written Opinion of the International Searching Authority issued Jun. 15, 2021, in connection with International Application No. PCT/KR2021/002273, 7 pages.
(Continued)

*Primary Examiner* — Edan Orgad
*Assistant Examiner* — Hidayat Dabiri

(57) ABSTRACT

The disclosure relates to a 5G or 6G communication system for supporting a higher data transmission rate.
Embodiments of the present disclosure provide a blind detection method for Physical Downlink Control Channel (PDCCH) candidate, comprising: determining a resource location of a serving cell for transmitting the PDCCH candidate corresponding to a Primary cell (Pcell), wherein, the serving cell includes Pcell and/or Secondary cell (Scell); and blindly detecting the PDCCH candidate corresponding to Pcell on the determined resource location of the serving
(Continued)

Determining a resource location of a serving cell for transmitting a PDCCH candidate corresponding to Pcell, wherein, the serving cell includes Pcell and/or Scell ～S101

Blindly detecting the PDCCH candidate corresponding to Pcell on the determined resource location of the serving cell ～S102 cell. Based on the solution of the embodiment of the present application, in a CA system, the allocation of the resources occupied by the PDCCH can be implemented more reasonably and effectively.

12 Claims, 3 Drawing Sheets

(51) Int. Cl.
*H04W 72/1268* (2023.01)
*H04W 72/1273* (2023.01)
*H04W 72/23* (2023.01)

(58) Field of Classification Search
CPC .............. H04W 74/0833; H04W 72/53; H04L 1/0038; H04L 5/0007; H04L 5/001; H04L 5/0053; H04L 27/2666; H04L 27/26025
See application file for complete search history.

(56) References Cited

U.S. PATENT DOCUMENTS

| | | | |
|---|---|---|---|
| 11,528,090 B2 | 12/2022 | Xiao et al. | |
| 2013/0058240 A1 | 3/2013 | Kim et al. | |
| 2013/0114539 A1 | 5/2013 | Kim et al. | |
| 2013/0188590 A1* | 7/2013 | Aiba ..................... | H04L 5/0055 |
| | | | 370/329 |
| 2014/0133427 A1 | 5/2014 | Kim et al. | |
| 2014/0198748 A1 | 7/2014 | Lee et al. | |
| 2014/0241319 A1 | 8/2014 | Lee et al. | |
| 2015/0341918 A1* | 11/2015 | Yang .................... | H04W 16/32 |
| | | | 370/312 |
| 2017/0164407 A1 | 6/2017 | Yang et al. | |
| 2019/0253308 A1 | 8/2019 | Huang et al. | |
| 2019/0281587 A1 | 9/2019 | Zhang et al. | |
| 2021/0168774 A1* | 6/2021 | Li ......................... | H04W 16/14 |
| 2022/0046683 A1* | 2/2022 | Takeda .............. | H04W 72/1273 |
| 2022/0408473 A1* | 12/2022 | Li ...................... | H04W 72/0453 |
| 2023/0388090 A1* | 11/2023 | Nory ..................... | H04L 5/0053 |

FOREIGN PATENT DOCUMENTS

| | | | | |
|---|---|---|---|---|
| CN | 110474737 A | 11/2019 | | |
| CN | 110830216 A | 2/2020 | | |
| WO | WO-2019214596 A1 * | 11/2019 | ........... | H04L 5/0044 |

OTHER PUBLICATIONS

Office Action issued Aug. 12, 2024, in connection with Chinese Patent Application No. 202010628867.7, 11 pages.
European Patent Office, "Extended European Search Report," dated Jun. 5, 2023, in connection with European Patent Application No. 21761369.4, 9 pages.
Panasonic, "Cross carrier scheduling from SCC to PCC", 3GPP TSG-RAN WG1 Meeting #61bis, R1-103750, Jul. 2010, 2 pages.
Communication pursuant to Article 94(3) EPC dated Mar. 11, 2025 in connection with EP application No. 21 761 369.4, 7 pages.
Office Action dated Mar. 25, 2025 in connection with CN application No. 202010628867.7, 14 pages.
Notification of the Decision to Grant a Patent Right for Patent for Invention dated Nov. 13, 2025, in connection with Chinese Application No. 202010628867.7, 10 pages.
Nokia Corporation, "Status Report to TSG-LTE Carrier Aggregation Enhancements-core part", TSG RAN meeting #53, RP-111014, Sep. 2011, 5 pages.

* cited by examiner

【Figure 1】
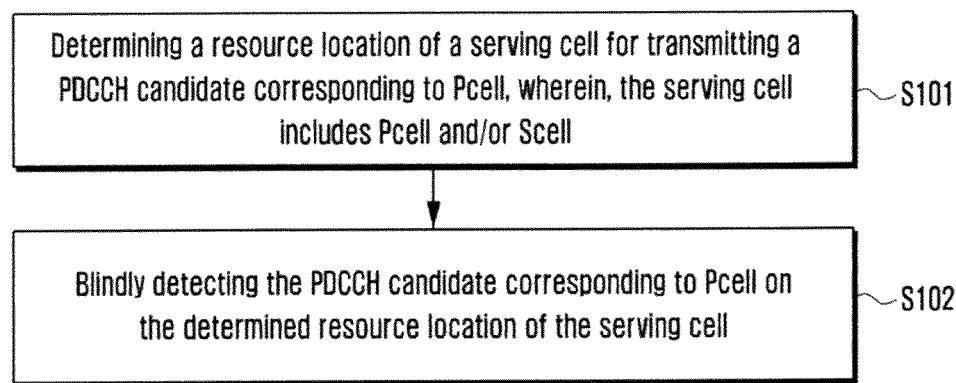
【Figure 2】
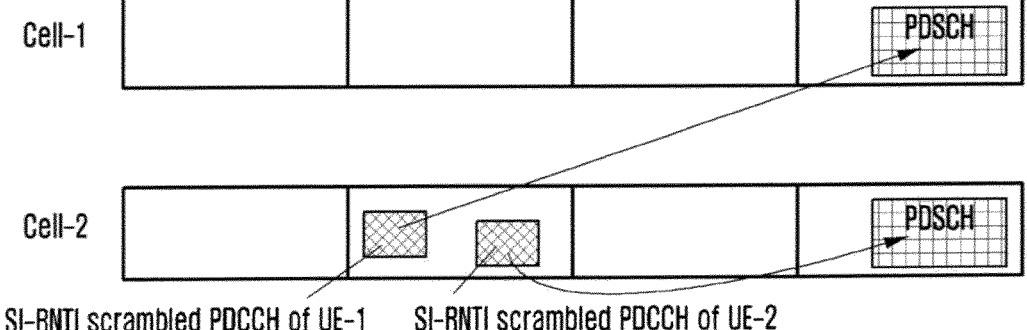
【Figure 3】
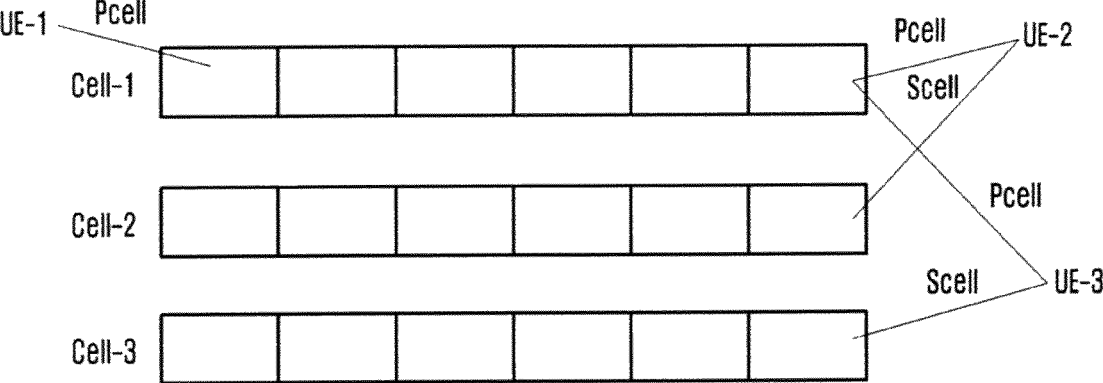

【Figure 4】
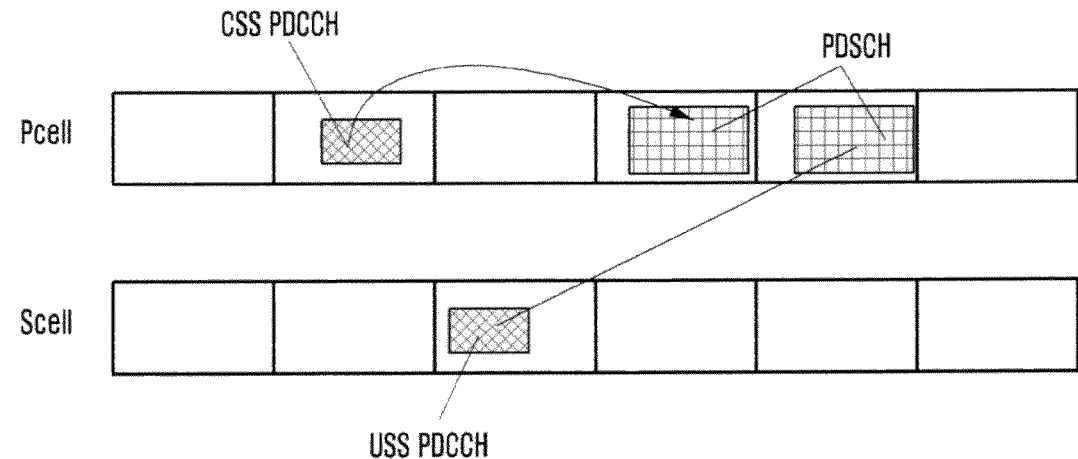
【Figure 5】
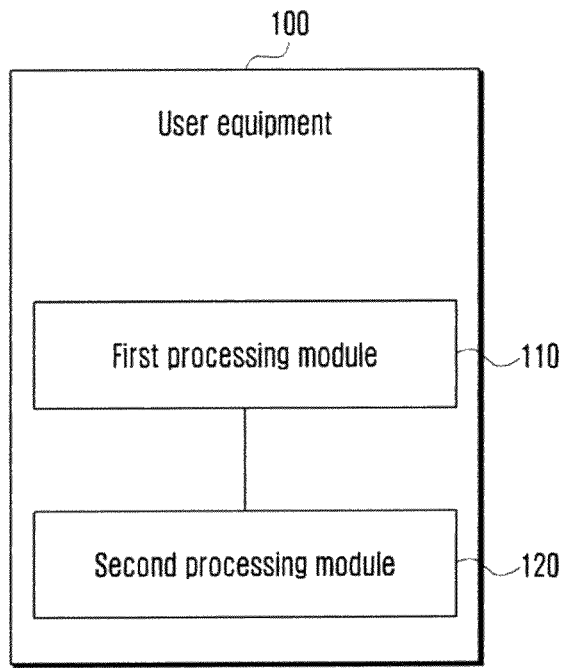

【Figure 6】
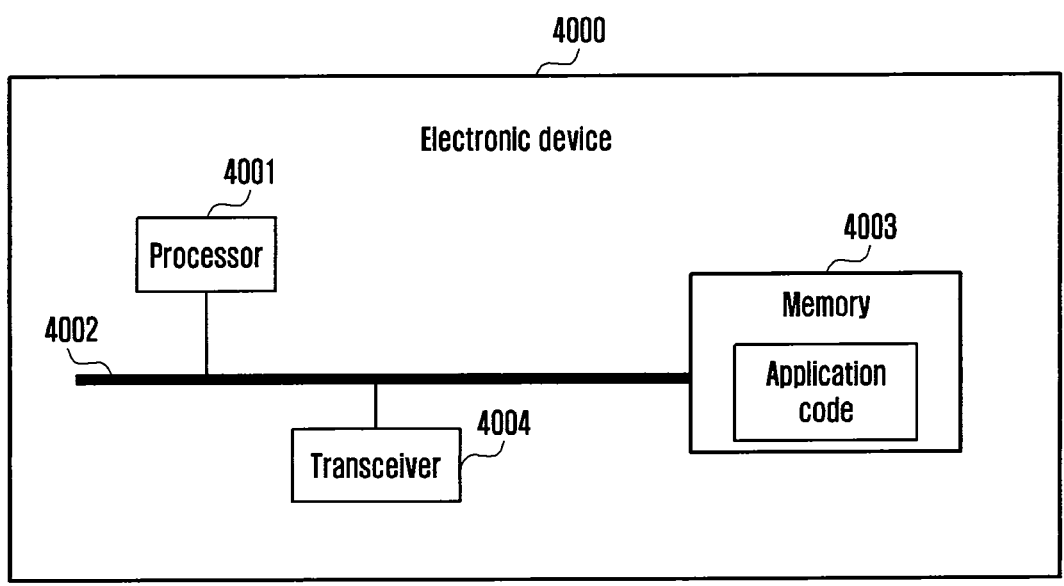

BLIND DETECTION METHOD AND APPARATUS FOR PDCCH CANDIDATE, USER EQUIPMENT, ELECTRONIC DEVICE AND STORAGE MEDIUM

CROSS-REFERENCE TO RELATED APPLICATIONS

This application is a 371 of International Application No. PCT/KR2021/002273 filed Feb. 24, 2021, which claims priority to Chinese Patent Application No. 202010120917.0 filed Feb. 26, 2020, and Chinese Patent Application No. 202010628867.7 filed Jul. 1, 2020, the disclosures of which are herein incorporated by reference in their entirety.

1. FIELD

The disclosure relates to a technical field of wireless communication. Specifically, the disclosure relates to a blind detection method for PDCCH candidate, user equipment, electronic device and storage medium.

2. DESCRIPTION OF RELATED ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In a Carrier Aggregation (CA) system, a serving cell may include a Primary cell (Pcell) and a Secondary cell (Scell). The subcarrier spacing configuration of Pcell and Scell may be same or different. When there are Pcell and Scell, how to allocate cell resources occupied by PDCCH more reasonably is also an important issue that needs to be improved.

In one embodiment, a method for blindly detecting a physical downlink control channel (PDCCH) candidate in a wireless communication system, the method comprising: determining a resource location of a serving cell for transmitting the PDCCH candidate corresponding to a primary cell (Pcell), wherein, the serving cell includes Pcell or secondary cell (Scell); and detecting the PDCCH candidate blindly corresponding to the Pcell on the determined resource location of the serving cell.

In another embodiment, a user equipment (UE) in a wireless communication system, the UE comprising: a first processing module configured to determine a resource location of a serving cell for transmitting the physical downlink control channel (PDCCH) candidate corresponding to a primary cell (Pcell), wherein the serving cell comprises the Pcell and a secondary cell (Scell); and a second processing module configured to blindly detect the PDCCH candidates corresponding to the Pcell on the determined resource location of the serving cell.

In another embodiment, an electronic device in a wireless communication system, the electronic device comprising: a transceiver; and a processor configured to: determine a resource location of a serving cell for transmitting the PDCCH candidate corresponding to a primary cell (Pcell), wherein, the serving cell includes Pcell or secondary cell (Scell), and detect the PDCCH candidate blindly corresponding to the Pcell on the determined resource location of the serving cell.

The aim of this disclosure is to provide a blind detection method for PDCCH candidate, user equipment, electronic device and storage medium. Based on this solution, the configuration of resources occupied by the PDCCH can be implemented more reasonably and effectively.

BRIEF DESCRIPTION OF THE DRAWINGS

In order to explain the technical solutions in the embodiments of the present disclosure more clearly, the drawings used in describing the embodiments of the present disclosure will be briefly illustrated below.

FIG. 1 illustrates a flow diagram of a blind detection method for PDCCH candidate according to an embodiment of the present application;

FIG. 2 illustrates a diagram of a blind detection for PDCCH candidate according to an embodiment of the present application;

FIG. 3 illustrates a diagram of a blind detection for PDCCH candidate according to an embodiment of the present application;

FIG. 4 illustrates a diagram of a blind detection for PDCCH candidate according to an embodiment of the present application;

FIG. 5 illustrates a schematic structural diagram of a user equipment according to an embodiment of the present application; and FIG. 6 illustrates a schematic structural diagram of an electronic device according to an embodiment of the present application.

DETAILED DESCRIPTION

Embodiments of the present application are described in detail below, examples of which are shown in the accompanying drawings, in which identical or similar reference numerals denote identical or similar elements or elements having identical or similar functions throughout. The embodiments described below by referring to the drawings are exemplary and are only used to explain the application, but cannot be interpreted as limiting the application.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

In order to better understand and explain the solutions of the embodiments of the present application, some technologies involved in the embodiments of the present application are briefly described below.

P-RNTI: indicating Paging Radio Network Temporary Indicator (RNTI), used for parsing paging information, corresponding to the paged PCCH;

SI-RNTI: indicating System Information RNTI, used for the transmission of SIB information (i.e., system information), corresponding to BCCH;

RA-RNTI: indicating Radom Access RNTI, used for PRACH response, corresponding to DL-SCH of RACH Response;

C-RNTI: indicating Cell RNTI, used for transmitting service information of UE;

T-CRNTI: indicating Temporary C-RNTI, mainly used in RACH, corresponding to Random Access Response Grant, random access process message 3 in PUSCH;

SPS-C-RNTI: Semi persistence Scheduling C-RNTI, used for transmission of semi-persistent scheduling PDSCH;

TPC-PUCCH-RNTI: indicating Transmit Power Control-Physical Uplink Control Channel-RNTI, used for parsing PUCCH uplink power control information;

TPC-PUSCH-RNTI: indicating Transmit Power Control-Physical Uplink Shared Channel-RNTI, used for parsing PUSCH uplink power control information;

M-RNTI: Multimedia Broadcast Multicast Service RNTI.

In a long-term evolution (LTE) system, the transmissions of physical downlink shared channel (PDSCH) and physical uplink shared channel (PUSCH) are scheduled through downlink control information (DCI) transmitted by physical downlink control channel (PDCCH). The search space for transmitting DCI includes common search space (CSS) set and user equipment (UE)-specific search space (USS) set. For CSS, demodulating and decoding can be performed on any UE, while for USS, demodulating and decoding can be performed on only certain UE. The format of DCI can be divided into DCI format for scheduling PDSCH (for example, DCI format 1-0, DCI format 1-1) and DCI format for scheduling PUSCH (for example, DCI format 0-0, DCI format 0-1). The format of DCI can also be divided into fallback DCI format (for example, DCI format 0-0, DCI format 1-0) and non-fallback DCI format (for example, DCI format 0-1, DCI format 1-1). The number of information bits (referred to as the number of bits for short) contained (for example, configured or required, etc.) in different format of DCIs may be same or different.

The number of bits contained (for example, configured or required, etc.) in DCI with a specific DCI format can be simply referred to as the number of bits of the specific DCI format. The PDCCH for scheduling PDSCH and PUSCH can be located in the same serving cell as the scheduled PDSCH and PUSCH, which is called co-carrier scheduling. The PDCCH for scheduling PDSCH and PUSCH can be located in different serving cells with the scheduled PDSCH and PUSCH, which is called cross-carrier scheduling, where the cell transmitting PDCCH is called the scheduling serving cell, and the serving cell transmitting PDSCH/PUSCH is called the scheduled serving cell. In a carrier aggregation (CA) system, a serving cell may include a primary cell (Pcell) and a secondary cell (Scell). The subcarrier spacing configuration of Pcell and Scell may be same or different. When there are Pcell and Scell, how to allocate cell resources occupied by PDCCH more reasonably is also an important issue that needs to be improved.

The aim of this disclosure is to provide a blind detection method for PDCCH candidate, user equipment, electronic device and storage medium. Based on this solution, the configuration of resources occupied by the PDCCH can be implemented more reasonably and effectively.

In a first aspect, an embodiment of the present application provides a blind detection method for PDCCH candidate, comprising:

determining a resource location of a serving cell for transmitting a PDCCH candidate corresponding to Pcell, wherein, the serving cell includes Pcell and/or Scell; and blindly detecting the PDCCH candidate corresponding to Pcell on the determined resource location of the serving cell.

Optionally, the step of determining a resource location of a serving cell for transmitting a PDCCH candidate corresponding to Pcell includes at least one of the followings:

determine that the resource location is at least one of a CSS set and a USS set of Pcell, and at least one of the CSS set and the USS set of Scell;

determining that the resource location is the CSS set and the USS set of Scell; and acquiring first indication information, and determining the resource location based on the first indication information.

Optionally, the step of determining that the resource location is at least one of a CSS set and a USS set of Pcell, and at least one of the CSS set and the USS set of Scell includes at least one of the followings:

determining that the resource location is the CSS set of Pcell and the USS set of Scell; and determining that the resource location is the CSS set and the USS set of Pcell, and the CSS set and the USS set of Scell.

Optionally, the PDCCH candidate corresponding to Pcell includes a first PDCCH candidate used for scheduling the PDSCH or the PUSCH transmitted in Pcell, and/or, a second PDCCH candidate not used for scheduling the PDSCH or the PUSCH transmitted in Pcell.

Optionally, when the resource location is the CSS set of Pcell and the USS set of Scell, the step of blindly detecting the PDCCH candidate corresponding to the Pcell in the CSS set of Pcell, and blindly detecting the PDCCH candidate corresponding to the Pcell in the USS set of Scell includes any one of the followings:

blindly detecting the first PDCCH candidate and the second PDCCH candidate in the CSS set of Pcell, blindly detecting the first PDCCH candidate in the USS set of Scell; and blindly detecting the first PDCCH candidate in the CSS set of Pcell, blindly detecting the second PDCCH candidate in the CSS set of Scell, and blindly detecting the first PDCCH candidate in the USS set of Scell.

Optionally, when the resource location is at least one of the CSS set and the USS set of Pcell, and at least one of the CSS set and the USS set of Scell, the step of blindly detecting the PDCCH candidate corresponding to the Pcell at the determined resource location of the serving cell includes:

blindly detecting a first part of the PDCCH candidates corresponding to Pcell in at least one of the CSS set and the USS set of Pcell;

blindly detecting a second part of the PDCCH candidates corresponding to Pcell in at least one of the CSS set and the USS set of Scell;

wherein, the first part of PDCCH candidates include at least one of the first PDCCH candidates, and/or at least one of the second PDCCH candidates; the second part of PDCCH candidates include at least one of the first PDCCH candidates, and/or at least one of the second PDCCH candidates.

Optionally, the method further includes:

acquiring second indication information; and determining a first part of PDCCH candidates and/or a second part of PDCCH candidates based on the second indication information.

Optionally, the first indication information includes at least one of the followings:

information indicating that the first PDCCH candidate is transmitted in the CSS set of Pcell and/or in the CSS set of Scell;

information indicating that the second PDCCH candidate is transmitted in the CSS set of Pcell and/or in the CSS set of Scell; and

information indicating that the first PDCCH candidate is transmitted in the US S set of Pcell and/or in the USS set of Scell.

Optionally, the method further includes:

acquiring a maximum number of the blind detection for PDCCH candidate corresponding to the serving cell, and/or a maximum number of non-overlapping control channel element (CCE) of the blind detection for PDCCH candidate in the serving cell.

Optionally, the step of acquiring a maximum number of the blind detection for PDCCH candidate corresponding to the serving cell, and/or a maximum number of non-overlapping control channel element (CCE) of the blind detection for PDCCH candidate in the serving cell includes at least one of the followings:

determining the maximum number of the blind detection for PDCCH candidate corresponding to the serving cell, and/or the maximum number of non-overlapping CCE of the blind detection for PDCCH candidate in the serving cell, based on the number of serving cells in which the UE supports the blind detection for PDCCH candidate and the number of serving cells configured for the UE; and acquiring a third indication information, and determining the maximum number of the blind detection for PDCCH candidate corresponding to the serving cell, and/or the maximum number of non-overlapping CCE of the blind detection for PDCCH candidate in the serving cell, based on the third indication information.

Optionally, the step of determining the maximum number of the blind detection for PDCCH candidate corresponding to the serving cell, and/or the maximum number of non-overlapping CCE of the blind detection for PDCCH candidate in the serving cell, based on the number of serving cells in which the UE supports the blind detection for PDCCH candidate and the number of serving cells configured for the UE includes at least one of the followings:

if the number of serving cells configured for the UE is less than or equal to the number of serving cells in which the UE supports the blind detection for PDCCH candidate, determining the maximum number of blind detection for PDCCH candidate corresponding to each serving cell configured for the UE, and/or the maximum number of non-overlapping CCE of blind detection for PDCCH candidate in each serving cell configured for the UE, based on a subcarrier spacing configuration of each serving cell configured for the UE; and if the number of serving cells configured for the UE is greater than the number of serving cells in which the UE supports the blind detection for PDCCH candidate, determining the sum of the maximum number of the blind detection for PDCCH candidate corresponding to all serving cells corresponding to each subcarrier spacing configuration configured for the UE, and/or the sum of the maximum number of non-overlapping CCE of the blind detection for PDCCH candidate in all serving cells corresponding to each subcarrier spacing configuration configured for the UE, based on the number of cells for transmitting PDCCH candidate of Pcell in the serving cells configured for the UE, the number of cells for transmitting PDCCH candidate of non-Pcell, the number of serving cells in which the UE supports the blind detection for PDCCH candidate and the subcarrier spacing configuration of each serving cell configured for the UE.

Optionally, the step of determining the sum of the maximum number of the blind detection for PDCCH candidate corresponding to all serving cells corresponding to each subcarrier spacing configuration configured for the UE, based on the number of cells for transmitting PDCCH candidate of Pcell in the serving cells configured for the UE, the number of cells for transmitting PDCCH candidate of non-Pcell, the number of serving cells in which the UE supports the blind detection for PDCCH candidate and the subcarrier spacing configuration of each serving cell configured for the UE includes:

determining the sum of the maximum number of the blind detection for PDCCH candidate corresponding to all serving cells corresponding to each subcarrier spacing configuration configured for the UE according to the following formula:

$$M_{PDCCH}^{total,slot,\mu_i} = \min \left\{ N_{cells}^{cap} \cdot M_{PDCCH}^{max,slot,\mu_i} \cdot N_{cells}^{DL,\mu_i} / \left( \sum_{j=0,not\ including\ Pcell}^{3} N_{cells}^{DL,j} + Pcell_1^{\mu 1} + \sum_{j=0}^{3} Pcell_2^j \right) \right\}$$

wherein, $$M_{PDCCH}^{total,slot,\mu_i}$$

represents the sum of the maximum number of the blind detection for PDCCH candidate corresponding to all serving cells in which the subcarrier spacing configuration is $\mu_i$ configured for the UE, $$N_{cells}^{cap}$$

represents the number of serving cells in which the UE supports the blind detection for PDCCH candidate, $$M_{PDCCH}^{max,slot,\mu_i}$$

represents the maximum number of the blind detection for PDCCH candidate that UE supports in the serving cell in which one subcarrier spacing configuration is $\mu_i$, $$N_{cells}^{DL,\mu_i}$$

represents the number of serving cells in which the subcarrier spacing configuration is $\mu_i$ configured for the UE, j represents the subcarrier spacing configuration, $$Pcell_1^{\mu 1}$$

represents the number of Pcell for transmitting PDCCH candidate of Pcell in the serving cells configured for the UE, $\mu_1$ represents the subcarrier spacing configuration of Pcell, $$\sum_{j=0}^{3} Pcell_2^j$$

represents the number of Scell for transmitting PDCCH candidate of Pcell in the serving cells configured for the UE, $$\sum_{j=0,not\ including\ Pcell}^{3} N_{cells}^{DL,j}$$

represents the number of serving cells for transmitting PDCCH candidate corresponding to non-Pcell in the serving cells configured for the UE, and $\lfloor \ \rfloor$ represents a symbol of round down;

the step of determining the sum of the maximum number of non-overlapping CCE of the blind detection for PDCCH candidate in all serving cells corresponding to each subcarrier spacing configuration configured for the UE, based on the number of cells for transmitting PDCCH candidate of Pcell in the serving cells configured for the UE, the number of cells for transmitting PDCCH candidate of non-Pcell, the number of serving cells in which the UE supports the blind detection for PDCCH candidate and the subcarrier spacing configuration of each serving cell configured for the UE includes:

determining the sum of the maximum number of non-overlapping CCE of the blind detection for PDCCH candidate in all serving cells corresponding to each subcarrier spacing configuration configured for the UE according to the following formula:

$$C_{PDCCH}^{total,slot,\mu_i} = \min \left\{ N_{cells}^{cap} \cdot C_{PDCCH}^{max,slot,\mu_i} \cdot N_{cells}^{DL,\mu_i} / \left( \sum_{j=0,not\ including\ Pcell}^{3} N_{cells}^{DL,j} + Pcell_1^{\mu 1} + \sum_{j=0}^{3} Pcell_2^j \right) \right\}$$

wherein, $$C_{PDCCH}^{total,slot,\mu_i}$$

represents the sum of the maximum number of non-overlapping CCE of the blind detection for PDCCH candidate in all serving cells in which subcarrier spacing configuration is $\mu_i$ configured for the UE, $$C_{PDCCH}^{max,slot,\mu_i}$$

represents the maximum number of non-overlapping CCE of the blind detection for PDCCH candidate that UE supports in the serving cell in which one subcarrier spacing configuration is $\mu_i$.

Optionally, the serving cell for transmitting the PDCCH candidate corresponding to Pcell includes Pcell and at least one Scell. If the resource location is the CSS set and/or USS set of the serving cell, Pcell is treated as alpha serving cells, and at least one Scell is treated as beta serving cells.

Optionally, alpha and beta satisfy:

0<alpha≤1, 0<beta≤1.

Optionally, determining alpha and beta in at least one of the following methods:

alpha and/or beta being agreed values;

receiving information indicating the use of alpha and/or beta, and determining alpha and/or beta based on the information; and determining alpha based on an agreed calculation method, and determining beta based on a predetermined relationship between alpha and beta.

Alpha and beta are determined based on the agreed calculation method.

Optionally, for a serving cell, if the serving cell is Scell of at least one first UE and Pcell of at least one second UE, and PDCCH candidates for scheduling PDSCH transmitted in Pcell of the first UE, and PDCCH candidates for scheduling PDSCH transmitted in Pcell of the second UE are both the serving cells, PDCCH candidates for scheduling PDSCH transmitted in Pcell of the first UE, and PDCCH candidates for scheduling PDSCH transmitted in Pcell of the second UE satisfy at least one of the followings:

the number of bits of the above two are different;

the above two employ different Radio Network Temporary Indicator (RNTI) to scramble Cyclic Redundancy Check (CRC); and the time-frequency locations of the CSS set where the above two are located do not overlap.

In a second aspect, an embodiment of the present application provides a user equipment, comprising:

a first processing module configured to determine a resource location of a serving cell for transmitting a PDCCH candidate corresponding to Pcell, the serving cell includes Pcell and/or Scell; and a second processing module configured to blindly detect the PDCCH candidate corresponding to Pcell on the determined resource location of the serving cell.

In a third aspect, an embodiment of the present application provides an electronic device, comprising:

a processor; and a memory configured to store machine-readable instructions, which when executed by the processor, cause the processor to execute the blind detection method for PDCCH candidate in the first aspect of the present application.

In a fourth aspect, an embodiment of the present application provides a computer-readable storage medium that stores a computer program, and the computer program is used to execute the blind detection method for PDCCH candidate in the first aspect of the present application.

The technical solutions provided in the embodiments of the present application have at least the following beneficial effects:

the blind detection method for PDCCH candidate provided in the embodiments of the present application may include: determining a resource location of a serving cell for transmitting a PDCCH candidate corresponding to Pcell, wherein, the serving cell includes Pcell and/or Scell; and blindly detecting the PDCCH candidate corresponding to Pcell on the determined resource location of the serving cell. Based on this method, the configuration of the resources occupied by the PDCCH can be implemented more reasonably and effectively.

The additional aspects and advantages of this application will be partly given in the following description, which will become obvious from the following description, or be understood through the practice of this application.

A UE blindly detects the PDCCH candidates transmitted in the CSS set. The PDCCH candidates include PDCCH candidates of different RNTI scrambled cyclic redundancy check (CRC), for example, PDCCH candidates of SI-RNTI, P-RNTI, RA-RNTI, TPC-PUSCH-RNTI, and TPC-PUCCH-RNTI scrambled CRC, may also include PDCCH candidates of C-RNTI scrambled CRC, etc. The UE blindly detects the PDCCH candidates transmitted in the USS, including PDCCH candidates of different RNTI scrambled CRC, for example, PDCCH candidates of C-RNTI scrambled CRC, etc.

Among them, the PDCCH candidates listed above (of course may also include other unlisted PDCCH candidates) can be divided into two categories. One is the PDCCH candidates used for scheduling the PDSCH and/or PUSCH of the serving cell, such as PDCCH candidates of SI-RNTI, P-RNTI, RA-RNTI scrambled CRC, the other is PDCCH candidates not used for scheduling the PDSCH and PUSCH of the serving cell, such as the above-mentioned PDCCH candidates of TPC-PUCCH-RNTI scrambled CRC are used to perform the power control of physical uplink control channel (PUCCH) transmitted in the serving cell, PDCCH candidates of TPC-PUSCH-RNTI scrambled CRC are used to perform the power control of PUSCH transmitted in the serving cell. Of course, in addition to PDCCH candidates for power control, the PDCCH candidates that are not used for scheduling PDSCH or PUSCH may also include other PDCCH candidates.

In the embodiments of this application, for the convenience of description, the above-mentioned PDCCH candidates that are not used for scheduling the PDSCH or PUSCH of the serving cell are referred to as a second PDCCH candidates, including but not limited to the above-mentioned PDCCH candidates for power control. The PDCCH candidates that are used for scheduling PDSCH or PUSCH are referred to as first PDCCH candidates. That is, the first PDCCH candidate may be the above-mentioned PDCCH candidate of P-RNTI scrambled CRC, PDCCH candidate of SI-RNTI scrambled CRC, PDCCH candidate of C-RNTI scrambled CRC. The second PDCCH candidate includes but not limited to at least one of the PDCCH candidate of TPC-PUCCH-RNTI scrambled CRC and PDCCH candidate of TPC-PUSCH-RNTI scrambled CRC. In the below description, the PDCCH candidate for power control will be used as an example to describe the processing of the second PDCCH candidate.

In a carrier aggregation (CA) system, there are Pcell and Scell, and the subcarrier spacing configuration of Pcell and Scell may be same or different. In order to reduce Pcell resource occupied by PDCCH, in the solution provided by the embodiment of this application, the PDSCH or PUSCH transmitted in Pcell can be scheduled by the PDCCH transmitted in Scell. Based on the solution provided by the embodiment of this application, the configuration of the resources occupied by the PDCCH can be implemented more reasonably and effectively.

In the solution provided in the embodiment of the application, the PDCCH candidate of Pcell (that is, the PDCCH candidate used to schedule the PDSCH or PUSCH transmitted in Pcell, or the PDCCH candidate not used to schedule the PDSCH or PUSCH transmitted in Pcell) is not necessarily transmitted in Pcell, that is, it may be transmitted in Pcell, or it may be transmitted in Scell.

In order to make the objectives, technical solutions, and advantages of the present application clearer, the following will further describe the embodiments of the present application in detail with reference to the accompanying drawings.

The embodiment of the application provides a blind detection method for PDCCH candidate, which can be specifically implemented by user equipment (UE). The flow diagram of the method is shown in FIG. 1, and the method can include:

Step 101: determining a resource location of a serving cell for transmitting a PDCCH candidate corresponding to Pcell, wherein, the serving cell includes Pcell and/or Scell; and Step 102: blindly detecting the PDCCH candidate corresponding to Pcell on the determined resource location of the serving cell.

Wherein, the PDCCH candidate corresponding to Pcell includes a first PDCCH candidate used for scheduling the PDSCH or the PUSCH transmitted in Pcell, and/or, a second PDCCH candidate not used for scheduling the PDSCH or the PUSCH transmitted in Pcell (including PDCCH candidate used for the power control of the PDSCH and/or PUSCH transmitted in Pcell and other PDCCH candidates not used for scheduling PDSCH or PUSCH). That is, the PDCCH candidate corresponding to Pcell described in the embodiment of the present application refers to the PDCCH candidate used for scheduling Pcell, that is, the DCI transmitted through the PDCCH candidate is for Pcell.

As can be seen from the foregoing description, the first PDCCH candidate may include one or more of PDCCH candidates of SI-RNTI scrambled CRC, PDCCH candidates of P-RNTI scrambled CRC, PDCCH candidates of RA-RNTI scrambled CRC, PDCCH candidates of C-RNTI scrambled CRC, PDCCH candidates of T-CRNTI scrambled CRC. The second PDCCH candidate can include PDCCH candidates of TPC-PUSCH-RNTI scrambled CRC and/or PDCCH candidates of TPC-PUCCH-RNTI scrambled CRC.

Based on the solution provided by the embodiments of this application, the PDCCH candidate of Pcell, that is, the PDCCH candidate corresponding to Pcell described above, can be transmitted in Pcell and/or Scell, that is, it may be transmitted in Pcell or Scell. Based on this solution, the configuration of the cell resources occupied by the PDCCH can be implemented more reasonably and effectively.

In an optional embodiment of the present application, the foregoing determining the resource location of the serving cell for transmitting the PDCCH candidate corresponding to Pcell specifically comprises at least one of the followings:

First item: determining that the resource location of the serving cell for transmitting the PDCCH candidate corresponding to Pcell is at least one of a CSS set and a USS set of Pcell, and at least one of the CSS set and the USS set of Scell;

Second item: determining that the resource location of the serving cell for transmitting the PDCCH candidate corresponding to Pcell is the CSS set and the USS set of Scell; and Third item: acquiring first indication information, and determining the resource location of the serving cell for transmitting the PDCCH candidate corresponding to Pcell based on the first indication information.

Optionally, for the above first term, determining that the resource location is at least one of the CSS set and the USS set of Pcell, and at least one of the CSS set and the USS set of Scell, may include at least one of the followings:

Item 1: determining that the resource location is the CSS set of Pcell and the USS set of Scell; and Item 2: determining that the resource location is the CSS set and the USS set of Pcell, and the CSS set and the USS set of Scell.

Optionally, for item 1, when performing blind detection of PDCCH candidates, specifically, blindly detecting the PDCCH candidate corresponding to Pcell in the CSS set of Pcell, and blindly detecting the PDCCH candidate corresponding to Pcell in the USS set of Scell, may include any one of the followings:

blindly detecting the first PDCCH candidate and the second PDCCH candidate in the CSS set of Pcell, blindly detecting the first PDCCH candidate in the USS set of Scell; and blindly detecting the first PDCCH candidate in the CSS set of Pcell, blindly detecting the second PDCCH candidate in the CSS set of Scell, and blindly detecting the first PDCCH candidate in the USS set of Scell.

In other words, the CSS set for scheduling the PDSCH or PUSCH transmitted in Pcell (that is, the first PDCCH candidate) can be in Pcell. The PDCCH in the CSS set of Pcell schedules the PDSCH or PUSCH of the same carrier. The system messages, paging messages, etc. are common to all UEs in the cell. Therefore, if the PDCCH candidates corresponding to these messages (such as PDCCH candidates of SI-RNTI scrambled CRC) are transmitted in Pcell, these PDCCH candidates are transmitted only once, which can effectively save Pcell resources occupied by PDCCH candidates. As for the second PDCCH candidate, it may be transmitted in Pcell or Scell. In addition, since the PDCCH candidates in the USS set are for specific UEs and not common to all UEs in the cell, the PDCCH candidates for scheduling the PDSCH or PUSCH transmitted in Pcell can be transmitted in the USS set of Scell, to Save Pcell resources.

Optionally, for item 2, when the resource location is at least one of the CSS set and the USS set of Pcell, and at least one of the CSS set and the USS set of Scell, blindly detecting the PDCCH candidate corresponding to Pcell at the determined resource location of the serving cell, may include:

blindly detect a first part of the PDCCH candidates corresponding to Pcell in at least one of the CSS set and the USS set of Pcell;

blindly detect a second part of the PDCCH candidates corresponding to Pcell in at least one of the CSS set and the USS set of Scell;

wherein, the first part of PDCCH candidates include at least one of the first PDCCH candidates, and/or at least one of the second PDCCH candidates; the second part of PDCCH candidates include at least one of the first PDCCH candidates, and/or at least one of the second PDCCH candidates.

A part of the PDCCH candidates of Pcell is blindly detected in Pcell, and this part is referred to as a first part of the PDCCH candidates. Optionally, the first part of the PDCCH candidates can be included in at least one of the first PDCCH candidates blindly detected in the CSS set, at least one of the second PDCCH candidates blindly detected in the CSS set, and at least one of the first PDCCH candidates blindly detected in the USS set, wherein, UE may determine which item (one or more) belongs to the first part of PDCCH candidates by receiving signaling or presetting protocol.

Other part of the PDCCH candidates of Pcell is blindly detected in Scell, and this part is referred to as a second part of the PDCCH candidates. Optionally, the second part of the PDCCH candidates can be included in at least one of the first PDCCH candidates blindly detected in the CSS set, at least one of the second PDCCH candidates blindly detected in the CSS set, and at least one of the first PDCCH candidates blindly detected in the USS set, wherein, UE may determine which item (one or more) belongs to the second part of PDCCH candidates by receiving signaling or presetting protocol.

It should be noted that the first part of PDCCH candidates and the second part of PDCCH candidates may include the same PDCCH candidates, or may be different PDCCH candidates.

Optionally, the method further includes:

acquire second indication information; and determine a first part of PDCCH candidates and/or a second part of PDCCH candidates based on the second indication information.

Optionally, UE may determine which PDCCH candidates are transmitted in Pcell and which PDCCH candidates are transmitted in Scell according to the first indication information. The manner in which the UE acquires the second indication information is not limited in this embodiment of the application. For example, the indication information may be agreed by a communication protocol, or the UE may obtain the indication information by receiving signaling sent by the base station.

Optionally, for third item, the above indication information may include at least one of the followings:

information indicating that the first PDCCH candidate is transmitted in the CSS set of Pcell and/or in the CSS set of Scell;

information indicating that the second PDCCH candidate is transmitted in the CSS set of Pcell and/or in the CSS set of Scell; and information indicating that the first PDCCH candidate is transmitted in the US S set of Pcell and/or in the USS set of Scell.

In other words, for the PDCCH candidate corresponding to Pcell, the UE can determine its specific transmission mode according to the indication information. Optionally, the above-mentioned indication information may specifically be high-layer signaling, and the UE may determine whether the PDCCH candidate is transmitted in Pcell or Scell by parsing the high-layer signaling. Based on this method, the base station may determine the used manner according to different requirements, and send corresponding indication information to the UE. Optionally, the foregoing indication information may also be preset protocol, and UE may determine its specific transmission mode according to the preset protocol.

In the embodiment of the present application, for the above-mentioned first item of the method, when the UE is blindly detecting/monitoring PDCCH candidates, it can blindly detect PDCCH candidates in the CSS set of Pcell, and blindly detect PDCCH candidates in the USS set of Scell, to reduce Pcell resources occupied by the PDCCH transmitted in the USS set, and the PDCCH for scheduling PDSCH or PUSCH transmitted in the USS set is transmitted in Scell, which can also save Pcell resources occupied by the PDCCH.

For the second item of the method, all PDCCH candidates corresponding to Pcell can be transmitted in Scell. By adopting this method, Pcell resources of the PDCCH occupied by Pcell can be greatly saved, and the number of blind detection for PDCCH candidates may not be increased.

For the third item of the method, whether the PDCCH candidate corresponding to Pcell is transmitted in Pcell or Scell can be determined by the UE based on the received indication information, that is, based on that UE performs indication through signaling, for example, UE can determine the above through the acquired high-layer signaling configuration. This method provides flexibility in saving Pcell resources and reducing the number of blind detection of PDCCH candidates. The base station can determine to adopt different PDCCH candidate transmission modes according to different requirements.

In an optional embodiment of the present application, the method may further include:

acquiring a maximum number of the blind detection for PDCCH candidate corresponding to the serving cell, and/or a maximum number of non-overlapping Control Channel Element (CCE) of the blind detection for PDCCH candidate in the serving cell.

Specifically, since the PDCCH candidate corresponding to Pcell can be transmitted in both Pcell and Scell, that is, the first PDCCH candidate used for scheduling PDSCH or PUSCH transmitted in Pcell, and/or, the second PDCCH candidate for power control of PUCCH and/or PUSCH in Pcell may be transmitted in two or more different serving cells, and since different PDCCHs have their own different maximum blind detection capabilities, for this method, UE also needs to obtain the maximum number of blind detection for PDCCH candidate corresponding to Pcell and Scell, and/or a maximum number of non-overlapping CCE of the blind detection for PDCCH candidate in Pcell and Scell, so that UE can perform blind detection in the search space of Pcell and Scell within the range of its own maximum blind detection capability, respectively.

In an optional embodiment of the present application, the step of acquiring a maximum number of the blind detection for PDCCH candidate corresponding to the serving cell, and/or a maximum number of non-overlapping control channel element (CCE) of the blind detection for PDCCH candidate in the serving cell includes at least one of the followings:

determining the maximum number of the blind detection for PDCCH candidate corresponding to the serving cell, and/or the maximum number of non-overlapping CCE of the blind detection for PDCCH candidate in the serving cell, based on the number of serving cells in which the UE supports the blind detection for PDCCH candidate and the number of serving cells configured for the UE; and acquiring a third indication information, and determining the maximum number of the blind detection for PDCCH candidate corresponding to the serving cell, and/or the maximum number of non-overlapping CCE of the blind detection for PDCCH candidate in the serving cell, based on the third indication information.

That is, UE may determine the maximum number of the blind detection for PDCCH candidate, and/or the maximum number of non-overlapping CCE of the blind detection for PDCCH candidate, based on the indication information received from the base station, or UE may calculate the above by self, wherein, the indication information may be explicit information or implicit information. In addition, the indication information may also be the information agreed in the agreement.

Optionally, the step of determining the maximum number of the blind detection for PDCCH candidate corresponding to the serving cell, and/or the maximum number of non-overlapping CCE of the blind detection for PDCCH candidate in the serving cell, based on the number of serving cells in which the UE supports the blind detection for PDCCH candidate and the number of serving cells configured for the UE includes at least one of the followings:

if the number of serving cells configured for the UE is less than or equal to the number of serving cells in which the UE supports the blind detection for PDCCH candidate, determining the maximum number of blind detection for PDCCH candidate corresponding to each serving cell configured for the UE, and/or the maximum number of non-overlapping CCE of blind detection for PDCCH candidate in each serving cell configured for the UE, based on a subcarrier spacing configuration of each serving cell configured for the UE; and if the number of serving cells configured for the UE is greater than the number of serving cells in which the UE supports the blind detection for PDCCH candidate, determining the sum of the maximum number of the blind detection for PDCCH candidate corresponding to all serving cells corresponding to each subcarrier spacing configuration configured for the UE, and/or the sum of the maximum number of non-overlapping CCE of the blind detection for PDCCH candidate in all serving cells corresponding to each subcarrier spacing configuration configured for the UE, based on the number of cells for transmitting PDCCH candidate of Pcell in the serving cells configured for the UE, the number of cells for transmitting PDCCH candidate of non-Pcell, the number of serving cells in which the UE supports the blind detection for PDCCH candidate and the subcarrier spacing configuration of each serving cell configured for the UE.

Optionally, the step of determining the sum of the maximum number of the blind detection for PDCCH candidate corresponding to all serving cells corresponding to each subcarrier spacing configuration configured for the UE, based on the number of serving cells configured for the UE (including the number of cells for transmitting PDCCH candidate of Pcell in the serving cells configured for the UE and the number of cells for transmitting PDCCH candidate of non-Pcell), the number of serving cells in which the UE supports the blind detection for PDCCH candidate and the subcarrier spacing configuration of each serving cell configured for the UE includes:

determining the sum of the maximum number of the blind detection for PDCCH candidate corresponding to all serving cells corresponding to each subcarrier spacing configuration configured for the UE according to the following formula:

$$M_{PDCCH}^{total,slot,\mu_i} = \left\lfloor N_{cells}^{cap} \cdot M_{PDCCH}^{max,slot,\mu_i} \cdot N_{cells}^{DL,\mu_i} / \left( \sum_{j=0,not\ including\ Pcell}^{3} N_{cells}^{DL,j} + Pcell_1^{\mu_1} + \sum_{j=0}^{3} Pcell_2^{j} \right) \right\rfloor;$$

Wherein, $$M_{PDCCH}^{total,slot,\mu_i}$$

represents the sum of the maximum number of the blind detection for PDCCH candidate corresponding to all serving cells in which the subcarrier spacing configuration is $\mu_i$ configured for the UE, $$N_{cells}^{cap}$$

represents the number of serving cells in which the UE supports the blind detection for PDCCH candidate, $$M_{PDCCH}^{max,slot,\mu_i}$$

represents the maximum number of the blind detection for PDCCH candidate that UE supports in the serving cell in which one subcarrier spacing configuration is $$N_{cells}^{DL,\mu_i}$$

represents the number of serving cells in which the subcarrier spacing configuration is $\mu_i$ configured for the UE, j represents the subcarrier spacing configuration, $$Pcell_1^{\mu_1}$$

represents the number of Pcell for transmitting PDCCH candidate of Pcell in the serving cells configured for the UE, $\mu_1$ represents the subcarrier spacing configuration of Pcell, $$\sum_{j=0}^{3} Pcell_2^{j}$$

represents the number of Scell for transmitting PDCCH candidate of Pcell in the serving cells configured for the UE, $$\sum_{j=0,not\ including\ Pcell}^{3} N_{cells}^{DL,j}$$

represents the number of serving cells for transmitting PDCCH candidate corresponding to non-Pcell in the serving cells configured for the UE.

The step of determining the sum of the maximum number of non-overlapping CCE of the blind detection for PDCCH candidate in serving cell corresponding to each subcarrier spacing configuration configured for the UE, in serving cell corresponding to each subcarrier spacing configuration configured for the UE, based on the number of the serving cells configured for the UE, the number of cells for transmitting PDCCH candidate of non-Pcell, the number of serving cells in which the UE supports the blind detection for PDCCH candidate and the subcarrier spacing configuration of each serving cell configured for the UE includes:

determining the sum of the maximum number of non-overlapping CCE of the blind detection for PDCCH candidate in all serving cells corresponding to each subcarrier spacing configuration configured for the UE according to the following formula:

$$C_{PDCCH}^{total,slot,\mu_i} = \left\lfloor N_{cells}^{cap} \cdot C_{PDCCH}^{max,slot,\mu_i} \cdot N_{cells}^{DL,\mu_i} / \left( \sum_{j=0,not\ including\ Pcell}^{3} N_{cells}^{DL,j} + Pcell_1^{\mu_1} + \sum_{j=0}^{3} Pcell_2^{j} \right) \right\rfloor$$

Wherein, $$C_{PDCCH}^{total,slot,\mu_i}$$

represents the sum of the maximum number of non-overlapping CCE of the blind detection for PDCCH candidate in all serving cells in which subcarrier spacing configuration is $\mu_i$ configured for the UE, $$C_{PDCCH}^{max,slot,\mu_i}$$

represents the maximum number of non-overlapping CCE of the blind detection for PDCCH candidate that UE supports in the serving cell in which one subcarrier spacing configuration is $\mu_i$.

In order to better explain the above optional embodiments of the present application, for UE, the PDCCH candidate of Pcell is transmitted in Pcell and one Scell of the UE as an example for description. That is, the PDCCH candidate corresponding to Pcell is transmitted in Pcell and one Scell. For the convenience of description, in the following example, when the maximum number of blind detection of the PDCCH candidate of the UE and the maximum number of non-overlapping CCE of the blind detection of the PDCCH candidate are determined, Pcell is treated as $$Pcell_1^{\mu 1}$$

serving cells, for example, $$Pcell_1^{\mu 1} = alpha,$$

and Scell is treated as $$Pcell_2^{\mu 2}$$

serving cells, for example, $$Pcell_2^{\mu 2} = beta,$$

where $\mu_1$ represents the subcarrier spacing configuration of Pcell, and $\mu_2$ represents the subcarrier spacing configuration of Scell.

For the blind detection of PDCCH, in order to ensure that the complexity of the blind detection of DCI of UE is not too large (for example, to ensure that the complexity of the blind detection of DCI is lower than the maximum complexity of the blind detection of DCI supported by the UE), the number of detection for PDCCH of each UE can be limited. For a serving cell, the maximum number that UE detects PDCCHs with different sizes (i.e., the number of bits of DCI) in each time unit (such as a time slot) is associated with subcarrier spacing configuration $\mu$ (different $\mu$ corresponds to different subcarrier spacing) of PDCCH. Specifically, for each serving cell the maximum number $$M_{PDCCH}^{max,slot,\mu}$$

of detecting PDCCHs with different sizes in each time slot in which the subcarrier spacing configuration is $\mu$ of the PDCCH are as shown in Table 1.

TABLE 1

| $\mu$ | $M_{PDCCH}^{max,slot,\mu}$ |
|---|---|
| 0 | 44 |
| 1 | 36 |
| 2 | 22 |
| 3 | 20 |

In addition, the maximum number that UE detects non-overlapping CCE can be limited. For a serving cell, the maximum number that UE can detect non-overlapping CCEs in each time unit (such as a time slot) or frequency domain unit (such as a span) is associated with subcarrier spacing configuration $\mu$ of PDCCH. Specifically, for each serving cell, the maximum number of detecting non-overlapping CCE in each time slot in which the subcarrier spacing configuration is $\mu$ of the PDCCH are as shown in Table 2.

TABLE 2

| $\mu$ | $C_{PDCCH}^{max,slot,\mu}$ |
|---|---|
| 0 | 56 |
| 1 | 56 |
| 2 | 48 |
| 3 | 32 |

The maximum numbers that UE detects the PDCCH and the non-overlapping CCE shown in Table 1 and Table 2 above are determined upon a serving cell being configured for UE.

In a CA or dual-connectivity (DC) communication system, UE is configured with CA or DC, and the CA or DC capability of the UE supports a predetermined number (for example, 4) of downlink serving cells. UE can indicate (that is, informs the base station) that the UE's ability to detect PDCCH is $$N_{cells}^{cap}$$

downlink serving cells through parameters (for example, pdcch-BlindDetectionCA), wherein, $$N_{cells}^{cap}$$

may be greater than the predetermined number, or may not be greater than the predetermined number. The base station can configure the number of serving cells for UE, such as one primary cell and at least one secondary cell.

For the serving cells configured by the base station for UE, if the number of configured serving cells is less than or equal to $$N_{cells}^{cap},$$

that is, the base station configures UE with a number of downlink serving cells less than or equal to $$N_{cells}^{cap},$$

that is, $$\sum_{j=0}^{3} N_{cells}^{DL,j} \le N_{cells}^{cap},$$

where $$\sum_{j=0}^{3} N_{cells}^{DL,j}$$

represents the number of serving cells configured by the base station for UE, j represents the subcarrier configuration, j=1 represents the above μ=1. As described above, the cell used for scheduling Pcell can include two parts, namely, $$Pcell_1^{\mu 1} \text{ and } Pcell_2^{\mu 2}.$$

At this time, the formula $$\sum_{j=0}^{3} N_{cells}^{DL,j} \le N_{cells}^{cap}$$

can become:

$$\sum_{j=0,not\ including\ Pcell}^{3} N_{cells}^{DL,j} + Pcell_1^{\mu 1} + Pcell_2^{\mu 2} \le N_{cells}^{cap}.$$

The maximum number of detection for different PDCCH $$M_{PDCCH}^{max,slot,\mu}$$

and the maximum number of detection for non-overlapping CCE $$C_{PDCCH}^{max,slot,\mu}$$

in each time slot of each downlink serving cell are respectively determined according to the subcarrier spacing configuration μ of each downlink serving cell, that is, it can be determined from the relationship between the subcarrier spacing configuration μ of each downlink serving cell respectively given in Table 1 and Table 2 above and $$M_{PDCCH}^{max,slot,\mu}, C_{PDCCH}^{max,slot,\mu}.$$

The maximum number of detection for PDCCH $$M_{PDCCH}^{max,slot,\mu}$$

and the maximum number of detection for non-overlapping CCE $$C_{PDCCH}^{max,slot,\mu}$$

in Table 1 and Table 2 above are determined in units of time slot, and the maximum number of detection for PDCCH and the maximum number of detection for non-overlapping CCE can also be determined in units of span. The time slot is used as an example to describe herein.

For the serving cell configured by the base station for UE, if the number of configured serving cells is greater than $$N_{cells}^{cap},$$

that is, $$\sum_{j=0,not\ including\ Pcell}^{3} N_{cells}^{DL,j} + Pcell_1^{\mu 1} + Pcell_2^{\mu 2} > N_{cells}^{cap},$$

for each serving cell configured by the base station for UE, the number of serving cells whose subcarrier spacing configuration is μ in these serving cells as $$N_{cells}^{DL,\mu},$$

for example, the base station configures three serving cells for the UE, and the subcarrier spacing configuration μ of the three serving cells are 0, 0, and 1, respectively, then the number of serving cells with a subcarrier spacing configuration of 0 is $$N_{cells}^{DL,0} = 2,$$

the number of serving cells with a subcarrier spacing configuration of 1 is $$N_{cells}^{DL,1} = 1.$$

At this time, for UE, the sum of the maximum number $$M_{PDCCH}^{total,slot,\mu}$$

of detection for different PDCCH in each time slot of $$N_{cells}^{DL,\mu}$$

serving cells with subcarrier spacing configuration μ is:

$$M_{PDCCH}^{total,slot,\mu} = \left\lfloor N_{cells}^{cap} \cdot M_{PDCCH}^{max,slot,\mu} \cdot N_{cells}^{DL,\mu} \middle/ \right.$$

$$\left. \left( \sum_{j=0,not\ including\ Pcell}^{3} N_{cells}^{DL,j} + Pcell_1^{\mu 1} + \sum_{j=0}^{3} Pcell_2^{\mu 2} \right) \right\rfloor$$

Correspondingly, for UE, the sum of the maximum number $$C_{PDCCH}^{total,slot,\mu}$$

of detection for non-overlapping CCE in each time slot of $$N_{cells}^{DL,\mu}$$

serving cells with subcarrier spacing configuration μ is:

$$C_{PDCCH}^{total,slot,\mu} = \left\lfloor N_{cells}^{cap} \cdot C_{PDCCH}^{max,slot,\mu} \cdot N_{cells}^{DL,\mu} \middle/ \right.$$

$$\left. \left( \sum_{j=0,not\ including\ Pcell}^{3} N_{cells}^{DL,j} + Pcell_1^{\mu 1} + \sum_{j=0}^{3} Pcell_2^{\mu 2} \right) \right\rfloor$$

Wherein, $$N_{cells}^{DL,\mu}$$

represents the number of downlink serving cells configured for the UE, with a subcarrier spacing configuration μ, and $$N_{cells}^{DL,j}$$

represents the number of downlink serving cells of the subcarrier spacing configuration μ=j in the downlink serving cell configured for UE, where $$N_{cells}^{DL,j}$$

includes two parts into which Pcell is divided:

$$Pcell_1^{\mu 1}\ and\ Pcell_2^{\mu 2}$$

That is, $$N_{cells}^{DL,j} = \left( \sum_{j=0,nont\ including\ Pcell}^{3} N_{cells}^{DL,j} + Pcell_1^{\mu 1} + Pcell_2^{\mu 2} \right),$$

it is understandable that in the formula, $$Pcell_1^{\mu 1}\ and\ Pcell_2^{\mu 2}$$

respectively represent the number of Pcell and the number of Scell for transmitting PDCCH candidates corresponding to Pcell of UE. In the example, the number of Scell for transmitting PDCCH candidates corresponding to Pcell of UE is 1.

Through the above formula, the sum of the maximum number of blind detection for PDCCH in each time slot of the serving cell corresponding to each subcarrier spacing configuration and the sum of the maximum number of detection of non-overlapping CCEs can be calculated, respectively.

As an illustrative example, assuming that $$N_{cells}^{cap} = 2,$$

the base station configures three serving cells for UE, namely, a primary cell Cell1, and two secondary cells Cell2 and Cell3, and the subcarrier spacing configuration u corresponding to Cell1, Cell2 and Cell3 is 0, 1 and 1, respectively. The serving cells for scheduling Cell1 are Cell1 and Cell2, that is, the serving cells for transmitting PDCCH candidate corresponding to Cell1 are Cell1 and Cell2, and Cell2 is also used to transmit PDCCH candidates of Cell2, Cell3 is used to transmit PDCCH candidates of Cell3. As an optional calculation method, in the above formula, $$N_{cells}^{DL,\mu=0} = 1,\ N_{cells}^{DL,\mu=1} = 2,\ Pcell_1^{\mu 1} = 1,$$

$$Pcell_2^{\mu 2} = 1,\ \sum_{j=0,not\ including\ Pcell}^{3} N_{cells}^{DL,j} = 2$$

(that is, Cell2 and Cell3, both cells are also used for scheduling themselves). Then the $$M_{PDCCH}^{total,slot,\mu}\ and\ C_{PDCCH}^{total,slot,\mu}$$

corresponding to the primary cell with μ=0, and the $$M_{PDCCH}^{total,slot,\mu}\ and\ C_{PDCCH}^{total,slot,\mu}$$

corresponding to two serving cells with μ=1 can be calculated by the above formula, respectively.

In an optional embodiment of the present application, the serving cell for transmitting PDCCH candidates corresponding to Pcell includes Pcell and at least one Scell. If the resource location is the CSS set and/or USS set of the serving cell, Pcell is treated as alpha serving cells, the at least one Scell is treated as beta serving cells, for processing.

That is to say, for Pcell, if the PDCCH candidate for scheduling Pcell is transmitted in both Pcell and Scell, the number of Pcell that schedules Pcell can be used as alpha, and the number of Scell that schedules Pcell can be used as beta. If the above at least one Scell are two secondary cells, then the number of two secondary cells is treated as beta.

It can be seen From the foregoing description that PDCCH candidates may be transmitted in the CSS set of a cell, or may be transmitted in the USS set, and the system resources occupied by the CSS set and the USS set are part of the system resources occupied by the cell. Therefore, optionally, the CSS set and the USS set can be taken as part of the cell, that is, the CSS set and the USS set correspond to less than or equal to one serving cell.

Specifically, when using this solution, in the above formula for determining the maximum number of blind detection for PDCCH candidate and the maximum number of non-overlapping CCE, assuming that the PDCCH candidates for scheduling Pcell are transmitted in the CSS set of Pcell and the USS set of one Scell, then $$Pcell_1^{\mu 1} = alpha, \quad Pcell_2^{\mu 2} = beta.$$

Correspondingly, if it is transmitted in the USS set of Pcell and the CSS set of two Scell, then $$Pcell_1^{\mu 1} = alpha, Pcell_2^{\mu 2} + Pcell_2^{\mu 3} = beta, \text{ where } Pcell_2^{\mu 2} \text{ and } Pcell_2^{\mu 3}$$

correspond to two Scell, The subcarrier spacing configuration $\mu_2$ and $\mu_3$ of the two Scell may be same or different.

For this solution, as an illustrative example, assuming that $$N_{cells}^{cap} = 2,$$

and the base station configures three serving cells for UE, namely, a primary cell Cell1, and two secondary cells Cell2 and Cell3, and the subcarrier spacing configuration $\mu$ corresponding to Cell1, Cell2 and Cell3 is 0, 1 and 1, respectively. The serving cells for scheduling Cell1 are Cell1 and Cell2, that is, the serving cells for transmitting PDCCH candidate corresponding to Cell1 are Cell1 and Cell2, and Cell2 is also used to transmit PDCCH candidates of Cell2, Cell3 is used to transmit PDCCH candidates of Cell3. As an optional calculation method, assuming that alpha=0.5, beta=0.8, in the above formula for calculating the sum of maximum number of blind detection for PDCCH candidate and the sum of maximum number of CCEs, $$Pcell_1^{\mu 1=0} = alpha = 0.5, Pcell_2^{\mu 2=1} = beta = 0.8,$$

$$\sum\nolimits_{j=0,not\ including\ Pcell}^{3} N_{cells}^{DL,j} = 2$$

(i.e., Cell2 and Cell3, both cells are also used for scheduling themselves), $$N_{cells}^{DL,\mu=0} = Pcell_1^{\mu 1=0} = 0.5,$$

$$N_{cells}^{DL,\mu=1} = Pcell_2^{\mu 2=1} + \sum\nolimits_{j=0,not\ including\ Pcell}^{3} N_{cells}^{DL,j} = 2.8.$$

Then the $$M_{PDCCH}^{total,slot,\mu} \text{ and } C_{PDCCH}^{total,slot,\mu}$$

corresponding to the primary cell with $\mu=0$, and the $$M_{PDCCH}^{total,slot,\mu} \text{ and } C_{PDCCH}^{total,slot,\mu}$$

corresponding to two serving cells with $\mu=1$ can be calculated by the above formula, respectively.

In an optional embodiment, assuming that the PDCCH candidate corresponding to Pcell is blindly detected in the CSS set of Pcell, and the PDCCH candidate corresponding to Pcell is blindly detected in the USS set of Scell, the step of acquiring the maximum number of blind detection for PDCCH candidate in the serving cell, and/or the maximum number of non-overlapping CCE of blind detection for PDCCH candidate in the serving cell may specifically include:

acquiring the maximum number of blind detection for PDCCH candidate in Pcell and Scell, and/or the maximum number of non-overlapping CCE of blind detection for PDCCH candidate in CSS set and/or USS set.

Correspondingly, the step of acquiring the maximum number of blind detection for PDCCH candidate in Pcell and Scell, and/or the maximum number of non-overlapping CCE of blind detection for PDCCH candidate in CSS set and/or USS set includes at least one of the followings:

receiving the information sent by the base station for indicating the maximum number of blind detection for PDCCH candidate in Pcell and Scell, and/or the maximum number of non-overlapping CCE of blind detection for PDCCH candidate in the CSS set and/or USS set (i.e., corresponding to the above third indication information);

treating the CSS set as alpha serving cells, treating the USS set as beta serving cells, and based on the total number of serving cells, determining the maximum number of blind detection for PDCCH candidate in Pcell and Scell, and/or the maximum number of non-overlapping CCE of blind detection for PDCCH candidate in the CSS set and/or USS set.

Wherein, when Scell for transmitting the PDCCH candidate corresponding to Pcell is more than one, such as two, the USS set being treated as beta serving cells in above is referred to as the USS sets of two Scell being treated as beta serving cells.

Wherein, alpha and beta satisfy: 0<alpha≤1, 0<beta≤1.

In an optional embodiment of the present application, determining alpha and beta in at least one of the following methods:

alpha and/or beta being agreed values;

receiving information indicating the use of alpha and/or beta, and determining alpha and/or beta based on the information; and determining alpha based on an agreed calculation method, and determining beta based on a predetermined relationship between alpha and beta.

Alpha and beta are determined based on the agreed calculation method.

Optionally, the step of determining alpha and beta based on the agreed calculation method include at least one of the followings:

determining alpha, based on the number of blind detection in the CSS set and the maximum number of blind detection for PDCCH candidate in a serving cell;

determining alpha, based on the number of non-overlapping CCE of blind detection for PDCCH candidate in the CSS set and the maximum number of non-overlapping CCE of blind detection for PDCCH candidate in a serving cell; and determining alpha, based on the number of blind detection in the CSS, the maximum number of blind detection for PDCCH candidate in the serving cell, the number of non-overlapping CCE of blind detection for PDCCH candidate in the CSS set of a serving cell, and the maximum number of non-overlapping CCE of blind detection for PDCCH candidate in a serving cell.

In other words, the maximum number of blind detection for PDCCH candidate in the aforementioned Pcell and Scell, and/or the maximum number of non-overlapping CCE of blind detection for PDCCH candidate in the CSS set and/or USS set, can be determined by the base station indicating UE, or by the UE itself in an agreed calculation method. In other words, information about the maximum number of blind detection for PDCCH candidate in Pcell and Scell, and/or the maximum number of non-overlapping CCE of blind detection for PDCCH candidate in the CSS set and/or USS set may be determined by the base station to indicate UE, or by the UE itself.

When UE determines them by itself, UE needs to know the specific values of alpha and beta. For acquiring the specific values, at least one of the methods shown in the above-mentioned optional embodiment can be used. Of course, using which method is agreed by UE and the base station. For the specific implementation for the UE to acquire the maximum number of blind detection for PDCCH candidate in Pcell and Scell, and/or the maximum number of non-overlapping CCE of blind detection for PDCCH candidate in the CSS set and/or USS set, different optional embodiments will be combined in the following for illustration, and will not be expanded here.

In an optional embodiment of the present application, for a serving cell, if the serving cell is Scell of at least one first UE and Pcell of at least one second UE, and PDCCH candidates for scheduling PDSCH transmitted in Pcell of the first UE, and PDCCH candidates for scheduling PDSCH transmitted in Pcell of the second UE are the serving cells, PDCCH candidates for scheduling PDSCH transmitted in Pcell of the first UE, and PDCCH candidates for scheduling PDSCH transmitted in Pcell of the second UE satisfy at least one of the followings:

the number of bits of the above two are different;

the above two employ different Radio Network Temporary Indicator (RNTI) to scramble cyclic redundancy check (CRC); and the time-frequency locations of the CSS set where the above two are located do not overlap.

In the CA system, since a serving cell may be Pcell of one UE and Scell of another UE at the same time, for example, cell-1 is Pcell of UE-1, cell-2 is Scell of UE-1, cell-2 is Pcell of UE-2, as shown in FIG. 2. In other words, cell-2 is used as both Scell of UE-1 and Pcell of UE-2. How to distinguish the PDCCH for scheduling the PDSCH transmitted by cell-1 (FIG. 2 shows the PDCCH candidate using SI-RNTI scrambled CRC as an example) and the PDCCH for scheduling the PDSCH transmitted in cell-2, that is, how to distinguish the PDCCH candidate for scheduling PDSCH transmitted in cell-2, for cell-1 or cell-2. In order to solve this problem, the embodiments of the present application provide the following several optional modes. The following describes these modes in combination with several optional embodiments.

Mode One:

The above can be distinguished by the number of bits of PDCCH, that is, to ensure that the number of bits of DCI in the PDCCH in Scell for scheduling the PDSCH transmitted by Scell is different from the number of bits of DCI in the PDCCH in Scell for scheduling the PDSCH transmitted by Pcell. If the same, by adding bit to make their number of bits different. For example, the number of bits of DCI in the PDCCH using SI-RNTI scrambled CRC in Scell for scheduling PDSCH transmitted by Pcell is 30, and the number of bits of DCI in the PDCCH using SI-RNTI scrambled CRC in Scell for scheduling PDSCH transmitted by Scell is also 30. In order to distinguish the above, the number of bits of DCI in the PDCCH using SI-RNTI scrambled CRC in Scell for scheduling PDSCH transmitted by Scell becomes 31, so that the number of bits of both are different.

It should be noted that, among the DCI in the PDCCH in Scell for scheduling the PDSCH transmitted by Scell, Scell is for the cross-carrier scheduled UE and Pcell is for other UEs. Similarly, among DCI in the PDCCH of the PDSCH transmitted by Pcell, scheduled in Scell, Pcell is for the cross-carrier scheduled UE. For example, if a serving cell A is Pcell of UE1, a serving cell B is Scell of UE1, the serving cell B is Pcell of UE2, the PDCCH candidate for scheduling the PDSCH transmitted in cell A is transmitted in cell B, and the PDCCH candidate for scheduling the PDSCH transmitted in cell B is also transmitted in cell B, the cell B is Scell of UE1, is Pcell of UE2. For UE1, the PDCCH candidate in cell B used for scheduling PDSCH transmitted in cell B is the PDCCH in Scell used for scheduling PDSCH transmitted in Scell, and the PDCCH candidate in cell B used for scheduling PDSCH transmitted in cell A is the PDCCH in Scell used for scheduling PDSCH transmitted in Pcell.

Mode Two:

The RNTI of the PDCCH scrambled CRC is different, RNTI scrambled CRC of the PDCCH in Scell for scheduling PDSCH transmitted by Scell is different from RNTI scrambled CRC of the PDCCH in Scell for scheduling PDSCH transmitted by Pcell.

Mode Three:

The time-frequency locations of the CSS do not overlap, that is, the time-frequency location of the CSS in which the PDCCH candidate in Scell for scheduling the PDSCH transmitted by Scell locates does not overlap with the time-frequency location of the CSS in which the PDCCH candidate in Scell for scheduling the PDSCH transmitted by Pcell locates. As such, UE can distinguish the PDCCH for scheduling the PDSCH transmitted by Pcell and the PDCCH for scheduling the PDSCH transmitted by Scell.

In order to describe the methods provided by the embodiments of the present application in more detail, the following will introduce the solutions of the present application in a comprehensive and detailed manner through a number of optional embodiments:

Optional Embodiment One

For the PDSCH or PUSCH transmitted in Pcell, the PDCCH scheduling PDSCH or PUSCH in the CSS set is transmitted in Pcell, that is, the CSS set of the PDCCH scheduling the PDSCH or PUSCH in Pcell is in Pcell, and the PDCCH in the CSS set of Pcell schedules PDSCH or PUSCH of co-carrier. The PDCCH scheduling PDSCH or PUSCH may include PDCCH of SI-RNTI, P-RNTI, RA- RNTI scrambled CRC, and PDCCH of C-RNTI scrambled CRC, etc. Since the PDSCH or PUSCH that transmits system information, paging information and random access information in Pcell is common to all users in the cell, if the PDCCH for scheduling the PDSCH or PUSCH that transmits system information, paging information and random access information is transmitted in Pcell, the PDCCH can be transmitted once, which can save the resources occupied by the PDCCH. For example, three UEs, namely UE-1, UE-2 and UE-3, Pcell of UE-1, UE-2 and UE-3 are all cell-1, UE-1 has only one serving cell being Pcell (cell-1), UE-2 includes 2 serving cells, where Pcell is cell-1, Scell is cell-2, and UE-3 includes 2 serving cells, where Pcell is cell-1 and Scell is cell-3. The PDCCH scheduling the PDSCH or PUSCH that transmits system information and so on is transmitted in cell-1, as shown in FIG. 3. In addition, in this way, the PDCCH in the CSS set of Pcell can schedule the PDSCH or PUSCH of co-carrier to facilitate UE reconfiguring Scell. This is because if all the PDSCHs or PUSCHs of Pcell are scheduled by the PDCCH of Scell, when the performance of Scell deteriorates, the PDSCH scheduled by the PDCCH cannot be used to reconfigure a new Scell with good performance for UE. If the PDCCH in the CSS set of Pcell schedules the PDSCH or PUSCH of co-carrier, when the performance of Scell deteriorates, the PDSCH scheduled by the PDCCH in the CSS set of Pcell can reconfigure a new Scell with good performance for UE.

Optionally, PDCCHs of TPC-PUSCH-RNTI, TPC-PUCCH-RNTI scrambled CRC are not used for scheduling PDSCH or PUSCH, but used for power control of PUCCH and PUSCH in Pcell. PDCCHs of TPC-PUSCH-RNTI, TPC-PUCCH-RNTI scrambled CRC can be transmitted in Pcell, and used for the power control of the PUCCH and PUSCH of Pcell. Since the CSS set is transmitted in one serving cell, the number of blind detection for PDCCH candidate in the CSS set can be reduced. PDCCHs of TPC-PUSCH-RNTI, TPC-PUCCH-RNTI scrambled CRC are not used for scheduling PDSCH or PUSCH, but used for power control of PUCCH and PUSCH in Pcell. PDCCHs of TPC-PUSCH-RNTI, TPC-PUCCH-RNTI scrambled CRC can be transmitted in Scell, and used for the power control of the PUCCH and PUSCH of Pcell, which can save the resources of Pcell occupied by PDCCH.

Optionally, the PDCCH for scheduling PDSCH or PUSCH transmitted in Pcell, transmitted in the USS set is transmitted in Scell, which can save the resources of Pcell occupied by PDCCH.

Optional Embodiment Two

For the PDSCH or PUSCH transmitted in Pcell, the PDCCH scheduling PDSCH or PUSCH in the CSS set and the PDCCH scheduling PDSCH or PUSCH in the USS set are both transmitted in Scell, and the PDCCH of TPC-PUSCH-RNTI, TPC-PUCCH-RNTI scrambled CRC is not used to schedule PDSCH or PUSCH, but is used for power control of PUCCH and PUSCH in Pcell. The PDCCH of TPC-PUSCH-RNTI, TPC-PUCCH-RNTI scrambled CRC can be transmitted in Scell. The method can save the resources of Pcell occupied by PDCCH, and since each PDCCH candidate can be transmitted in one serving cell, that is, Scell, based on this solution, the number of blind detection for PDCCH candidate may not be increased.

Optional Embodiment Three

For the PDSCH or PUSCH transmitted in Pcell, whether the PDCCH scheduling the PDSCH or PUSCH in the CSS set is transmitted in the Pcell or the Scell can be indicated by signaling, for example, determined by high-layer signaling configuration or preset by the protocol. Or, the PDCCH scheduling PDSCH or PUSCH in the CSS set is transmitted in both Pcell and Scell.

Optionally, whether the PDCCH of TPC-PUSCH-RNTI, TPC-PUCCH-RNTI scrambled CRC used for power control of PUCCH and PUSCH in Pcell is transmitted in Pcell or Scell can be indicated by signaling, for example, determined by high-layer signaling configuration or preset by the protocol. Or, the PDCCH of TPC-PUSCH-RNTI, TPC-PUCCH-RNTI scrambled CRC used for power control of PUCCH and PUSCH in Pcell is transmitted in both Pcell and Scell.

Optionally, whether the PDCCH used for scheduling PUCCH and PUSCH transmitted in USS set is transmitted in Pcell or Scell can be indicated by signaling, for example, determined by high-layer signaling configuration or preset by the protocol. Or, the PDCCH used for scheduling PUCCH and PUSCH transmitted in USS set is transmitted in both Pcell and Scell.

The above method provides flexibility in saving Pcell resources and reducing the number of blind detection for PDCCH candidate. The base station can determine adopting different methods according to different requirements.

Optional Embodiment Four

When the CSS set (may include PDCCH of TPC-PUSCH-RNTI, TPC-PUCCH-RNTI scrambled CRC for power control of PUCCH and PUSCH in Pcell, if including, treating as CSS in which PDCCH in Pcell for scheduling PDSCH or PUSCH in Pcell locates) in which PDCCH for scheduling PDSCH or PUSCH in Pcell locates is transmitted in Pcell, the USS set (may include PDCCH of TPC-PUSCH-RNTI, TPC-PUCCH-RNTI scrambled CRC for power control of PUCCH and PUSCH in Pcell, if including, treating as USS in which PDCCH in Scell for scheduling PDSCH or PUSCH in Pcell locates) in which PDCCH for scheduling PDSCH or PUSCH in Pcell locates is transmitted in Scell, as shown in the example shown in FIG. 4. The CSS set (CSS PDCCH shown in Figure) in which PDCCH candidate for scheduling PDSCH in Pcell locates is transmitted in Pcell, and the USS set (USS PDCCH shown in Figure) in which PDCCH candidate for scheduling PDSCH in Pcell locates is transmitted in Scell. At this time, the determination of the maximum number of blind detection for PDCCH candidate and the maximum number of non-overlapping CCE used for blind detection of PDCCH candidate includes the following methods.

Optionally, since the PDCCH in the CSS set that schedules PDSCH or PUSCH transmitted in Pcell is transmitted in Pcell, the PDCCH in the USS set that schedules PDSCH or PUSCH transmitted in Pcell is transmitted in Pcell is transmitted in Scell, and the PDCCH of TPC-PUSCH-RNTI, TPC-PUCCH-RNTI scrambled CRC used for power control of PUCCH and PUSCH in Pcell may be transmitted in the CSS set of Pcell, or, the PDCCH of TPC-PUSCH-RNTI, TPC-PUCCH-RNTI scrambled CRC used for power control of PUCCH and PUSCH in Pcell may be transmitted in the CSS set of Scell. That is, for the PDCCH for PDSCH/PUSCH scheduling and power control of PUCCH/PUSCH of Pcell, a part of the PDCCH candidates are transmitted in Pcell, and the other part of the PDCCH candidates are transmitted in Scell. At this time, how to determine the maximum number of blind detection for these two parts of PDCCH candidate and the maximum number of non-overlapping CCE of blind detection for PDCCH candidate.

The PDCCH candidates transmitted in Pcell will be described below by taking the PDCCH candidates scheduled in the CSS set of the PDSCH or PUSCH transmitted in Pcell as an example. The PDCCH candidates transmitted in Scell will be described below by taking the PDCCH candidates in USS set that schedules PDSCH or PUSCH in Pcell transmitted in Scell as an example.

Optionally, when calculating the UE's maximum number of blind detection for PDCCH candidate for each serving cell and the maximum number of non-overlapping control CCE used for blind detection of PDCCH candidate, PDCCH candidate in CSS set that schedules the PDSCH or PUSCH in Pcell, transmitted in Pcell, is treated as alpha serving cells, and PDCCH candidate in USS set that schedules the PDSCH or PUSCH in Pcell, transmitted in Scell, is treated as beta serving cells (beta is greater than 0 and less than or equal to 1, and UE can acquire beta value by presetting or receiving signaling, for example, by receiving high-layer signaling configuration, beta can also be calculated through the number of blind detection in the USS and the maximum number of blind detection for PDCCH candidate in the USS in a serving cell or the maximum number of non-overlapping CCE of blind detection for PDCCH candidate, or calculated by alpha, for example, beta=1-alpha).

Wherein, alpha is greater than 0 and less than or equal to 1. For the specific value of alpha, the alpha value can be acquired by presetting (that is, an agreed value) or by receiving signaling, for example, by receiving high-layer signaling configuration.

As another optional, the value of alpha can also be calculated from the number of blind detection in the CSS set and the maximum number of blind detection for PDCCH candidate in a serving cell. For example, assuming that the number of blind detection in CSS is 16, the maximum number of blind detection for PDCCH candidate in a serving cell is 44, then alpha=16/44; or the value of alpha can be calculated from the number of non-overlapping CCE of blind detection for PDCCH candidate in the CSS set and the maximum number of non-overlapping CCE of blind detection for PDCCH candidate in a serving cell. For example, the number of non-overlapping CCE of blind detection for PDCCH candidate in the CSS set is 32, and the maximum number of non-overlapping CCE of blind detection for PDCCH candidate in a serving cell is 56, then alpha=32/56, or the value of alpha can be calculated from the number of blind detection in the CSS set and the maximum number of blind detection for PDCCH candidate in the CSS set as well as the number of non-overlapping CCE of blind detection for PDCCH candidate in the CSS set and the maximum number of non-overlapping CCE of blind detection for PDCCH candidate in a serving cell. For example, the number of blind detection in CSS is 16, and the maximum number of blind detection for PDCCH candidate in a serving cell is 44, then alpha-1=16/44, the number of non-overlapping CCE of blind detection for PDCCH candidate in the CSS set is 32, and the maximum number of non-overlapping CCE of blind detection for PDCCH candidate in a serving cell is 56, then alpha-2=32/56, and alpha is equal to the maximum or minimum value of alpha-1 and alpha-2.

It is understandable that in the above example of acquiring the alpha value, the description is made by taking alpha as an example, and the above method is also applicable to acquiring the beta value. Of course, in practical applications, if the values of alpha and beta have a certain fixed relationship, for example, the sum of the two is equal to a fixed value, then after acquiring the value of alpha, the value of beta can be determined based on the fixed relationship. Similarly, in the above example, the description is based on the CSS set, and the same applies to the USS set.

In addition, it should be noted that the acquiring of the alpha value and/or beta value can be performed by the base station or by the UE. For example, when the acquiring of the alpha value and/or beta value is performed by the base station, the base station can acquire the alpha value and/or beta value and then send them to the UE. Of course, optionally, UE may also acquire the alpha value and the beta value, and based on the alpha value and the beta value, determine the maximum number of blind detection for PDCCH candidate in Pcell and Scell, and/or the maximum number of non-overlapping CCE of blind detection for PDCCH candidate in the CSS set and/or USS set, and indicate the determined result to the UE, or the UE can calculate the maximum number of blind detection for PDCCH candidate and/or the maximum number of non-overlapping CCE of blind detection for PDCCH candidate by self after determining the alpha value and the beta value.

For the convenience of description, in the description of each optional manner below, the CSS set is still used as an example for description. It can be understood that each optional manner is also applicable to the USS set.

Optionally, when alpha and beta are equal to 1, since the PDCCH in the CSS set that schedules PDSCH or PUSCH transmitted in Pcell is transmitted in Pcell, the PDCCH in the USS set that schedules PDSCH or PUSCH transmitted in Pcell is transmitted in Scell, upon calculating the maximum number of blind detection for PDCCH candidate in each serving cell of UE or the maximum number of non-overlapping CCE of blind detection for PDCCH candidate, the CSS set that schedules PDSCH or PUSCH in Pcell transmitted in Pcell and the USS set that schedules PDSCH or PUSCH in Pcell transmitted in Scell are treated as two different serving cells. In this way, when the subcarrier spacing configuration of Pcell and Scell are different, the maximum number of blind detection for PDCCH candidate or the maximum number of non-overlapping CCE of blind detection for PDCCH candidate in each serving cell is easily determined. For example, UE-1 is configured with four serving cells, namely Pcell, Scell-1, Scell-2, and Scell-3.

The CSS set for scheduling PDSCH or PUSCH in Pcell is transmitted in Pcell, the USS set for scheduling PDSCH or PUSCH in Pcell is transmitted in Pcell, the USS set for scheduling PDSCH or PUSCH in Scell-1 is transmitted in Scell-1, the USS set for scheduling PDSCH or PUSCH in Scell-2 is transmitted in Scell-2, and the USS set for scheduling PDSCH or PUSCH in Scell-3 is transmitted in Scell-3. In fact, UE is configured with four serving cells, treated as five serving cells upon calculating the maximum number of blind detection for PDCCH candidate or the maximum number of non-overlapping CCE of blind detection for PDCCH candidate for each serving cell of UE, that is, the CSS set that schedules PDSCH or PUSCH in Pcell transmitted in Pcell is used as one serving cell, the USS set that schedules PDSCH or PUSCH in Pcell transmitted in Scell-1 is used as one serving cell, the USS set that schedules PDSCH or PUSCH in Scell-1 transmitted in Scell-1 is used as one serving cell, the USS set that schedules PDSCH or PUSCH in Scell-2 transmitted in Scell-2 is used as one serving cell, and the USS set that schedules PDSCH or PUSCH in Scell-3 transmitted in Scell-3 is used as one serving cell.

Optionally, when beta+alpha=1, upon calculating the maximum number of blind detection for PDCCH candidate or the maximum number of non-overlapping CCE of blind detection for PDCCH candidate for each serving cell of UE, the CSS set that schedules PDSCH or PUSCH in Pcell transmitted in Pcell and the USS set that schedules PDSCH or PUSCH in Pcell transmitted in Scell are treated as one serving cell. For example, when beta=1-alpha, UE-1 is configured with four serving cells, namely Pcell, Scell-1, Scell-2, Scell-3, the CSS set for scheduling PDSCH or PUSCH in Pcell is transmitted in Pcell, the USS set for scheduling PDSCH or PUSCH in Scell-1 is transmitted in Scell-1, the USS set for scheduling PDSCH or PUSCH in Scell-2 is transmitted in Scell-2, and the USS set for scheduling PDSCH or PUSCH in Scell-3 is transmitted in Scell-3. In fact, the UE is configured with four serving cells, treated as four serving cells upon calculating the maximum number of blind detection for PDCCH candidate or the maximum number of non-overlapping CCE of blind detection for PDCCH candidate for each serving cell of UE, that is, the CSS set that schedules PDSCH or PUSCH in Pcell transmitted in Pcell is used as one serving cell, the USS set that schedules PDSCH or PUSCH in Pcell transmitted in Scell-1 is used as one serving cell, and when the subcarrier spacing configuration of Pcell and Scell-1 are different, the CSS set in Pcell and the USS set in Scell-1 each occupy part of the maximum number of blind detection for PDCCH candidate or the maximum number of non-overlapping CCE of blind detection for PDCCH candidate in a serving cell.

Optionally, when 2>beta+alpha>1, upon calculating the maximum number of blind detection for PDCCH candidate or the maximum number of non-overlapping CCE of blind detection for PDCCH candidate for each serving cell of UE, the CSS set that schedules PDSCH or PUSCH in Pcell transmitted in Pcell is used as alpha serving cells, and the USS set that schedules PDSCH or PUSCH in Scell transmitted in Scell is used as beta serving cells.

Optionally, UE-1 is configured with four serving cells, namely Pcell, Scell-1, Scell-2, Scell-3, the CSS set for scheduling PDSCH or PUSCH in Pcell is transmitted in Pcell, the USS set for scheduling PDSCH or PUSCH in Pcell is transmitted in Scell-1, the USS set for scheduling PDSCH or PUSCH in Scell-1 is transmitted in Scell-1, the USS set for scheduling PDSCH or PUSCH in Scell-2 is transmitted in Scell-2 and the USS set for scheduling PDSCH or PUSCH in Scell-3 is transmitted in Scell-3. In fact, the UE is configured with four serving cells, treated as 3+alpha+beta serving cells upon calculating the maximum number of blind detection for PDCCH candidate or the maximum number of non-overlapping CCE of blind detection for PDCCH candidate for each serving cell of UE, that is, the CSS set that schedules PDSCH or PUSCH in Pcell transmitted in Pcell is used as alpha serving cells, the USS set that schedules PDSCH or PUSCH in Pcell transmitted in Scell-1 is used as beta serving cells, the USS set that schedules PDSCH or PUSCH in Scell-1 transmitted in Scell-1 is used as one serving cell, the USS set that schedules PDSCH or PUSCH in Scell-2 transmitted in Scell-2 is used as one serving cell, and the USS set that schedules PDSCH or PUSCH in Scell-3 transmitted in Scell-3 is used as one serving cell.

Based on the same inventive concept as the method provided in this application, an embodiment of this application also provides a user equipment (UE). As shown in FIG. 5, the user equipment 100 may include:

a first processing module 110 configured to determine a resource location of a serving cell for transmitting a PDCCH candidate corresponding to Pcell, the serving cell includes Pcell and/or Scell; and a second processing module 120 configured to blindly detect the PDCCH candidate corresponding to Pcell on the determined resource location of the serving cell.

Optionally, the first processing module 110 may be configured to:

determine that the resource location is at least one of a CSS set and a USS set of Pcell, and at least one of the CSS set and the USS set of Scell;

determine that the resource location is the CSS set and the USS set of Scell; and acquire first indication information, and determine the resource location based on the first indication information.

Optionally, upon determining that the resource location is at least one of the CSS set and the USS set of Pcell, and at least one of the CSS set and the USS set of Scell, the first processing module 110 may specifically be configured to perform at least one of the followings:

determining that the resource location is the CSS set of Pcell and the USS set of Scell; and determining that the resource location is the CSS set and the USS set of Pcell, and the CSS set and the USS set of Scell.

Optionally, the PDCCH candidate corresponding to Pcell includes a first PDCCH candidate used for scheduling the PDSCH or the PUSCH transmitted in Pcell, and/or, a second PDCCH candidate not used for scheduling the PDSCH or the PUSCH transmitted in Pcell.

Optionally, when the resource location is the CSS set of Pcell and the USS set of Scell, upon blindly detecting the PDCCH candidate corresponding to Pcell in the CSS set of Pcell, and blindly detecting the PDCCH candidate corresponding to Pcell in the USS set of Scell, the second processing module 120 may specifically be configured to perform any one of the followings:

blindly detecting the first PDCCH candidate and the second PDCCH candidate in the CSS set of Pcell, blindly detecting the first PDCCH candidate in the USS set of Scell; and blindly detecting the first PDCCH candidate in the CSS set of Pcell, blindly detecting the second PDCCH candidate in the CSS set of Scell, and blindly detecting the first PDCCH candidate in the USS set of Scell.

Optionally, when the resource location is at least one of the CSS set and the USS set of Pcell, and at least one of the CSS set and the USS set of Scell, the second processing module may be configured to:

blindly detect a first part of the PDCCH candidates corresponding to Pcell in at least one of the CSS set and the USS set of Pcell;

blindly detect a second part of the PDCCH candidates corresponding to Pcell in at least one of the CSS set and the USS set of Scell;

wherein, the first part of PDCCH candidates include at least one of the first PDCCH candidates, and/or at least one of the second PDCCH candidates; the second part of PDCCH candidates include at least one of the first PDCCH candidates, and/or at least one of the second PDCCH candidates.

Optionally, the first processing module may be configured to:

acquire second indication information; and determine a first part of PDCCH candidates and/or a second part of PDCCH candidates based on the second indication information.

Optionally, the first indication information includes at least one of the followings:

information indicating that the first PDCCH candidate is transmitted in the CSS set of Pcell and/or in the CSS set of Scell;

information indicating that the second PDCCH candidate is transmitted in the CSS set of Pcell and/or in the CSS set of Scell; and information indicating that the first PDCCH candidate is transmitted in the US S set of Pcell and/or in the USS set of Scell.

Optionally, the second processing module 120 may also be configured to:

acquire a maximum number of the blind detection for PDCCH candidate corresponding to the serving cell, and/or a maximum number of non-overlapping CCE of the blind detection for PDCCH candidate in the serving cell.

Optionally, upon acquiring a maximum number of the blind detection for PDCCH candidate corresponding to the serving cell, and/or a maximum number of non-overlapping CCE of the blind detection for PDCCH candidate in the serving cell, the second processing module may be configured to perform at least one of the followings:

determining the maximum number of the blind detection for PDCCH candidate corresponding to the serving cell, and/or the maximum number of non-overlapping CCE of the blind detection for PDCCH candidate in the serving cell, based on the number of serving cells in which the UE supports the blind detection for PDCCH candidate and the number of serving cells configured for the UE; and acquiring a third indication information, determining the maximum number of the blind detection for PDCCH candidate corresponding to the serving cell based on the third indication information, and/or the maximum number of non-overlapping CCE of the blind detection for PDCCH candidate in the serving cell.

Optionally, the second processing module may be configured to perform at least one of the followings:

when the number of serving cells configured for the UE is less than or equal to the number of serving cells in which the UE supports the blind detection for PDCCH candidate, determining the maximum number of blind detection for PDCCH candidate corresponding to each serving cell configured for the UE, and/or the maximum number of non-overlapping CCE of blind detection for PDCCH candidate in each serving cell configured for the UE, based on a subcarrier spacing configuration of each serving cell configured for the UE; and when the number of serving cells configured for the UE is greater than the number of serving cells in which the UE supports the blind detection for PDCCH candidate, determining the sum of the maximum number of the blind detection for PDCCH candidate corresponding to all serving cells corresponding to each subcarrier spacing configuration configured for the UE, and/or the sum of the maximum number of non-overlapping CCE of the blind detection for PDCCH candidate in all serving cells corresponding to each subcarrier spacing configuration configured for the UE, based on the number of cells for transmitting PDCCH candidate of Pcell in the serving cells configured for the UE, the number of cells for transmitting PDCCH candidate of non-Pcell, the number of serving cells in which the UE supports the blind detection for PDCCH candidate and the subcarrier spacing configuration of each serving cell configured for the UE.

Optionally, when determining the sum of the maximum number of the blind detection for PDCCH candidate corresponding to all serving cells corresponding to each subcarrier spacing configuration configured for the UE, based on the number of the serving cells configured for the UE, the number of serving cells in which the UE supports the blind detection for PDCCH candidate and the subcarrier spacing configuration of each serving cell configured for the UE, the second processing module may be configured to:

determine the sum of the maximum number of the blind detection for PDCCH candidate corresponding to all serving cells corresponding to each subcarrier spacing configuration configured for the UE according to the following formula:

$$M_{PDCCH}^{total,slot,\mu_i} = \left\lfloor N_{cells}^{cap} \cdot M_{PDCCH}^{max,slot,\mu_i} \cdot N_{cells}^{DL,\mu_i} \middle/ \left( \sum_{j=0,not\ including\ Pcell}^{3} N_{cells}^{DL,j} + Pcell_1^{\mu_1} + \sum_{j=0}^{3} Pcell_2^j \right) \right\rfloor$$

Wherein, $$M_{PDCCH}^{total,slot,\mu_i}$$

represents the sum of the maximum number of the blind detection for PDCCH candidate corresponding to all serving cells in which the subcarrier spacing configuration is $\mu_i$ configured for the UE, $$N_{cells}^{cap}$$

represents the number of serving cells in which the UE supports the blind detection for PDCCH candidate, $$M_{PDCCH}^{max,slot,\mu_i}$$

represents the maximum number of the blind detection for PDCCH candidate that UE supports in the serving cell in which one subcarrier spacing configuration is $\mu_i$, $$N_{cells}^{DL,\mu_i}$$

represents the number of serving cells in which the subcarrier spacing configuration is $\mu_i$ configured for the UE, j represents the subcarrier spacing configuration, $$Pcell_1^{\mu_1}$$

represents the number of Pcell for transmitting PDCCH candidate of Pcell in the serving cells configured for the UE, $\mu_1$ represents the subcarrier spacing configuration of Pcell, $$\sum_{j=0}^{3} Pcell_2^j$$

represents the number of Scell for transmitting PDCCH candidate of Pcell in the serving cells configured for the UE, $$\sum_{j=0,not\ including\ Pcell}^{3} N_{cells}^{DL,j}$$

represents the number of serving cells for transmitting PDCCH candidate corresponding to non-Pcell in the serving cells configured for the UE, and $\lfloor\ \rfloor$ represents a symbol of round down.

when determining the sum of the maximum number of non-overlapping CCE of the blind detection for PDCCH candidate in all serving cells corresponding to each subcarrier spacing configuration configured for the UE, based on the number of the serving cells configured for the UE, the number of serving cells in which the UE supports the blind detection for PDCCH candidate and the subcarrier spacing configuration of each serving cell configured for the UE, the second processing module may be configured to:

determine the sum of the maximum number of non-overlapping CCE of the blind detection for PDCCH candidate in all serving cells corresponding to each subcarrier spacing configuration configured for the UE according to the following formula:

$$C_{PDCCH}^{total,slot,\mu_i} = \left\lfloor N_{cells}^{cap} \cdot C_{PDCCH}^{max,slot,\mu_i} \cdot N_{cells}^{DL,\mu_i} \middle/ \left( \sum_{j=0,not\ including\ Pcell}^{3} N_{cells}^{DL,j} + Pcell_1^{\mu_1} + \sum_{j=0}^{3} Pcell_2^j \right) \right\rfloor$$

Wherein, $$C_{PDCCH}^{total,slot,\mu_i}$$

represents the sum of the maximum number of non-overlapping CCE of the blind detection for PDCCH candidate in all serving cells in which subcarrier spacing configuration is $\mu_i$ configured for the UE, $$C_{PDCCH}^{max,slot,\mu_i}$$

represents the maximum number of non-overlapping CCE of the blind detection for PDCCH candidate that UE supports in the serving cell in which one subcarrier spacing configuration is $\mu_i$.

Optionally, the serving cell for transmitting the PDCCH candidate corresponding to Pcell includes Pcell and at least one Scell. If the resource location is the CSS set and/or USS set of the serving cell, Pcell is treated as alpha serving cells, and at least one Scell is treated as beta serving cells.

Wherein, alpha and beta satisfy: 0<alpha≤1, 0<beta≤1.

Optionally, the second processing module 120 determines alpha and beta in at least one of the following methods:

alpha and/or beta being agreed values;

receiving information indicating the use of alpha and/or beta, and determining alpha and/or beta based on the information; and determining alpha based on an agreed calculation method, and determining beta based on a predetermined relationship between alpha and beta.

Alpha and beta are determined based on the agreed calculation method.

Optionally, for a serving cell, if the serving cell is Scell of at least one first UE and Pcell of at least one second UE, and PDCCH candidates for scheduling PDSCH transmitted in Pcell of the first UE, and PDCCH candidates for scheduling PDSCH transmitted in Pcell of the second UE are both the serving cells, PDCCH candidates for scheduling PDSCH transmitted in Pcell of the first UE, and PDCCH candidates for scheduling PDSCH transmitted in Pcell of the second UE satisfy at least one of the followings:

the number of bits of the above two are different;

the above two employ different radio network temporary indicator (RNTI) to scramble cyclic redundancy check (CRC); and the time-frequency locations of the CSS sets where the above two are located do not overlap.

For content not described in detail in the user equipment provided in the embodiments of this application, please refer to the above-mentioned blind detection method for PDCCH candidate. The beneficial effects that the UE provided in the embodiments of this application can achieve are same as the above-mentioned blind detection methods for PDCCH candidate, and do not repeated again here.

Based on the same inventive concept as the method provided in this application, an embodiment of this application also provides a user equipment, comprising: a processor; and a memory configured to store machine-readable instructions, which when executed by the processor, cause the processor to execute the method in any one of optional embodiments of the present application.

Based on the same inventive concept as the method provided in this application, an embodiment of the present application provides a computer-readable storage medium that stores a computer program, and the computer program is used to execute the method in any one of optional embodiments of the present application upon execution by the processor.

In an optional embodiment, FIG. 6 shows a schematic structural diagram of an electronic device (the electronic device may be UE) suitable to solutions according to embodiments of present application. As shown in FIG. 6, the electronic device 4000 may include a processor 4001 and a memory 4003. The processor 4001 is connected to the memory 4003, for example, via the bus 4002. Optionally, the electronic device 4000 may further include a transceiver 4004. It should be noted that in practical applications, the number of transceivers 4004 is not limited to one, and the structure of the electronic device 4000 does not limit the embodiments of the present disclosure.

The processor 4001 may be a central processing unit (CPU), a general-purpose processor, a digital signal processor (DSP), an application specific integrated circuit (ASIC), a field programmable gate array (FPGA), or other programmable logic devices, transistor logic devices, hardware components, or any combination thereof. It is possible to implement or execute the various exemplary logical blocks, modules and circuits described in combination with the disclosures of the present disclosure. The processor 4001 may also be a combination of computing functions, such as a combination of one or more microprocessor, a combination of a DSP and a microprocessor, and so on.

The bus 4002 may include a path for communicating information between the above components. The bus 4002 may be a peripheral component interconnect (PCI) bus or an extended industry standard architecture (EISA) bus. The bus 4002 may be divided into an address bus, a data bus, a control bus, and so on. For the sake of presentation, FIG. 6 only uses one thick line to represent the bus, but it does not mean that there is only one bus or one type of bus.

The memory 4003 may be a read only memory (ROM) or other type of static storage device that can store static information and instructions, random access memory (RAM) or other types of dynamic storage device that can store information and instructions, also may be electrically erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage media or other magnetic storage devices, or any other medium that can be used to carry or store desired program code in the form of instructions or data structures and can be accessed by a computer, but not limited to this.

The memory 4003 is configured to store application program codes that, when executed by the processor 4001, implement the solution of the present disclosure. The processor 4001 is configured to execute the application program code stored in the memory 4003 to implement the content shown in any one of the foregoing method embodiments.

The invention claimed is:

1. A user equipment (UE) in a communication system, the UE comprising:

a transceiver; and a controller configured to:

receive, from a base station, information for a value of alpha used to determine a maximum number of physical downlink control channel (PDCCH) candidates to monitor on a primary cell (PCell) and a secondary cell (SCell), wherein the PCell is scheduled from the PCell and the SCell, and wherein the value of alpha is a rational number less than 1, determine a maximum number of first PDCCH candidates to monitor on the PCell based on the value of alpha, determine a maximum number of second PDCCH candidates to monitor on the SCell based on the value of alpha, monitor first PDCCH candidates on the PCell based on the maximum number of first PDCCH candidates, and monitor second PDCCH candidates on the SCell based on the maximum number of second PDCCH candidates.

2. The UE of claim 1, wherein the first PDCCH candidates are in common search space (CSS) set on the PCell, and wherein a first PDCCH associated with the first PDCCH candidates in the CSS set includes downlink control information (DCI) format with cyclic redundancy check (CRC) scrambled by one of system information radio network temporary identifier (SI-RNTI), paging RNTI (P-RNTI), random access RNTI (RA-RNTI), temporary cell RNTI (TC-RNTI), and cell RNTI (C-RNTI).

3. The UE of claim 1, wherein the second PDCCH candidate are in UE-specific search space (USS) set on the SCell based on a signaling from the base station.

4. A base station in a communication system, the base station comprising:

a transceiver; and a controller configured to:

transmit, to a user equipment (UE), information for a value of alpha used to determine a maximum number of physical downlink control channel (PDCCH) candidates to monitor on a primary cell (PCell) and a secondary cell (SCell), wherein the PCell is scheduled from the PCell and the SCell, and wherein the value of alpha is a rational number less than 1, transmit, to the UE, a first PDCCH associated with first PDCCH candidates on the PCell, and transmit, to the UE, a second PDCCH associated with second PDCCH candidates on the SCell, wherein a maximum number of the first PDCCH candidates to monitor on the PCell is based on the value of alpha, and wherein a maximum number of second PDCCH candidates to monitor on the SCell is based on the value of alpha.

5. The base station of claim 4, wherein the first PDCCH candidates are in common search space (CSS) set on the PCell, and wherein the first PDCCH associated with first PDCCH candidates in the CSS set includes downlink control information (DCI) format with cyclic redundancy check (CRC) scrambled by one of system information radio network temporary identifier (SI-RNTI), paging RNTI (P-RNTI), random access RNTI (RA-RNTI), temporary cell RNTI (TC-RNTI), and cell RNTI (C-RNTI).

6. The base station of claim 4, wherein the second PDCCH candidates are in UE-specific search space (USS) set on the SCell according to a signaling to the UE.

7. A method performed by a user equipment (UE) in a communication system, the method comprising:

receiving, from a base station, information for a value of alpha used to determine a maximum number of physical downlink control channel (PDCCH) candidates to monitor on a primary cell (PCell) and a secondary cell (SCell), wherein the PCell is scheduled from the PCell and the SCell, and wherein the value of alpha is a rational number less than 1;

determining a maximum number of first PDCCH candidates to monitor on the PCell based on the value of alpha, determining a maximum number of second PDCCH candidates to monitor on the SCell based on the value of alpha, monitoring first PDCCH candidates on the PCell based on the maximum number of first PDCCH candidates; and monitoring second PDCCH candidates on the SCell based on the maximum number of second PDCCH candidates.

8. The method of claim 7, wherein the first PDCCH candidates are in common search space (CSS) set on the PCell, and wherein a first PDCCH associated with the first PDCCH candidates in the CSS set includes downlink control information (DCI) format with cyclic redundancy check (CRC) scrambled by one of system information radio network temporary identifier (SI-RNTI), paging RNTI (P-RNTI), random access RNTI (RA-RNTI), temporary cell RNTI (TC-RNTI), and cell RNTI (C-RNTI).

9. The method of claim 7, wherein the second PDCCH candidates are in UE-specific search space (USS) set on the SCell based on a signaling from the base station.

10. A method performed by a base station in a communication system, the method comprising:

transmitting, to a user equipment (UE), information for a value of alpha used to determine a maximum number of physical downlink control channel (PDCCH) candidates to monitor on a primary cell (PCell) and a secondary cell (SCell), wherein the PCell is scheduled from the PCell and the SCell, and wherein the value of alpha is a rational number less than 1;

transmitting, to the UE, a first PDCCH associated with first PDCCH candidates on the PCell; and transmitting, to the UE, a second PDCCH associated with second PDCCH candidates on the SCell, wherein a maximum number of the first PDCCH candidates to monitor on the PCell is based on the value of alpha, and wherein a maximum number of second PDCCH candidates to monitor on the SCell is based on the value of alpha.

11. The method of claim 10, wherein the first PDCCH candidates are in common search space (CSS) set on the PCell, and wherein the first PDCCH associated with the first PDCCH candidates in the CSS set includes downlink control information (DCI) format with cyclic redundancy check (CRC) scrambled by one of system information radio network temporary identifier (SI-RNTI), paging RNTI (P-RNTI), random access RNTI (RA-RNTI), temporary cell RNTI (TC-RNTI), and cell RNTI (C-RNTI).

12. The method of claim 10, wherein the second PDCCH candidates are in UE-specific search space (USS) set on the SCell according to a signaling to the UE.

*   *   *   *   *